(12) United States Patent
Donalek et al.

(10) Patent No.: US 10,621,762 B2
(45) Date of Patent: Apr. 14, 2020

(54) SYSTEMS AND METHODS FOR HIGH DIMENSIONAL 3D DATA VISUALIZATION

(71) Applicant: Virtualitics, Inc., Pasadena, CA (US)

(72) Inventors: Ciro Donalek, Pasadena, CA (US); Michael Amori, Pasadena, CA (US); Justin Gantenberg, Pasadena, CA (US); Sarthak Sahu, Pasadena, CA (US); Aakash Indurkhya, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 16/133,631

(22) Filed: Sep. 17, 2018

(65) Prior Publication Data

US 2019/0347837 A1 Nov. 14, 2019

Related U.S. Application Data

(60) Provisional application No. 62/671,378, filed on May 14, 2018.

(51) Int. Cl.
*G06T 11/20* (2006.01)
*G06T 17/20* (2006.01)

(52) U.S. Cl.
CPC ............ *G06T 11/206* (2013.01); *G06T 17/20* (2013.01)

(58) Field of Classification Search
None
See application file for complete search history.

(56) References Cited

U.S. PATENT DOCUMENTS 5,461,708 A * 10/1995 Kahn .................... G06F 17/246
345/440
6,057,856 A 5/2000 Miyashita et al.
(Continued)

FOREIGN PATENT DOCUMENTS

| EP | 3353751 A1 | 8/2018 |
| WO | 2014130044 A1 | 8/2014 |

(Continued)

OTHER PUBLICATIONS

Elkan, Charles, "Using the Triangle Inequality to Accelerate k-Means", Proceedings of the Twentieth International Conference on Machine Learning (ICML) 2003, Conference date: Aug. 21-24, 2003, Washington DC, 7 pgs.

(Continued)

*Primary Examiner* — Xiao M Wu
*Assistant Examiner* — Steven Z Elbinger
(74) *Attorney, Agent, or Firm* — KPPB LLP

(57) ABSTRACT

Data visualization processes can utilize machine learning algorithms applied to visualization data structures to determine visualization parameters that most effectively provide insight into the data, and to suggest meaningful correlations for further investigation by users. In numerous embodiments, data visualization processes can automatically generate parameters that can be used to display the data in ways that will provide enhanced value. For example, dimensions can be chosen to be associated with specific visualization parameters that are easily digestible based on their importance, e.g. with higher value dimensions placed on more easily understood visualization aspects (color, coordinate, size, etc.). In a variety of embodiments, data visualization processes can automatically describe the graph using natural language by identifying regions of interest in the visualization, and generating text using natural language generation (Continued)

processes. As such, data visualization processes can allow for rapid, effective use of voluminous, high dimensional data sets.

20 Claims, 14 Drawing Sheets
(7 of 14 Drawing Sheet(s) Filed in Color)

(56) References Cited

U.S. PATENT DOCUMENTS

| | | | |
|---|---|---|---|
| 6,154,723 | A | 11/2000 | Cox et al. |
| 6,628,312 | B1 | 9/2003 | Rao et al. |
| 6,750,864 | B1* | 6/2004 | Anwar ............... G06F 17/30489 |
| | | | 345/440 |
| 8,773,508 | B2 | 7/2014 | Daniel et al. |
| 9,098,559 | B2 | 8/2015 | Muenkel |
| 9,465,891 | B1 | 10/2016 | Kagan et al. |
| 9,665,988 | B2 | 5/2017 | Djorgovski et al. |
| 9,953,372 | B1* | 4/2018 | Dziabiak ............... G06Q 40/08 |
| 10,417,812 | B2 | 9/2019 | Djorgovski et al. |
| 2001/0012018 | A1 | 8/2001 | Hayhurst |
| 2004/0041846 | A1 | 3/2004 | Hurley et al. |
| 2004/0061702 | A1* | 4/2004 | Kincaid ................ G06T 11/206 |
| | | | 345/440 |
| 2005/0223337 | A1 | 10/2005 | Wheeler et al. |
| 2006/0069635 | A1 | 3/2006 | Ram et al. |
| 2006/0072799 | A1* | 4/2006 | McLain .................. G06T 5/009 |
| | | | 382/128 |
| 2008/0079719 | A1 | 4/2008 | Woo |
| 2010/0053159 | A1* | 3/2010 | Visser ..................... G06T 15/08 |
| | | | 345/424 |
| 2010/0316284 | A1 | 12/2010 | Jeong et al. |
| 2011/0211056 | A1 | 9/2011 | Publicover et al. |
| 2012/0053986 | A1 | 3/2012 | Cardno et al. |
| 2013/0097563 | A1 | 4/2013 | Carlos et al. |
| 2014/0071138 | A1* | 3/2014 | Gibson ................ G06T 11/206 |
| | | | 345/501 |
| 2014/0108905 | A1* | 4/2014 | Wolters ................ G06F 3/0481 |
| | | | 715/227 |
| 2014/0151035 | A1* | 6/2014 | Cohen ..................... E21B 43/00 |
| | | | 166/250.15 |
| 2015/0113460 | A1* | 4/2015 | High ...................... G06F 9/4443 |
| | | | 715/771 |
| 2015/0205840 | A1 | 7/2015 | Yerli et al. |
| 2016/0086353 | A1* | 3/2016 | Lukac ........................ G06T 9/00 |
| | | | 345/419 |
| 2017/0092008 | A1* | 3/2017 | Djorgovski ........... G06T 19/006 |
| 2017/0132792 | A1* | 5/2017 | Jerebko .................. A61B 6/025 |
| 2017/0185668 | A1* | 6/2017 | Convertino ............. G06F 17/18 |
| 2017/0193688 | A1 | 7/2017 | Djorgovski et al. |
| 2017/0249401 | A1* | 8/2017 | Eckart .................. G06F 17/5009 |
| 2018/0000371 | A1* | 1/2018 | Gupta ..................... A61B 5/726 |
| 2019/0081865 | A1* | 3/2019 | Schrupp ................. H04L 41/22 |

FOREIGN PATENT DOCUMENTS

| | | |
|---|---|---|
| WO | 2014193418 A1 | 12/2014 |
| WO | 2017054004 A1 | 3/2017 |
| WO | 2017054004 A8 | 3/2017 |

OTHER PUBLICATIONS

Etemadpour, Ronak et al., "Choosing Visualization Techniques for Multidimensional Data Projection Tasks: A Guideline with Examples", Computer Vision, Imaging and Computer Graphics Theory and Applications, vol. 598, Mar. 2015, 21 pgs.
Flick, Jasper, "Catlike Coding, Unity C# Tutorials: Building a Graph, Visualizing Math", Retrieved from: https://catlikecoding.com/unity/tutorials/basics/building-a-graph/, 2017, 30 pgs.
Fraiss et al., "Rendering Large Point Clouds in Unity", Technische Universitat Wien, Bachelor of Science, Medieninformatik und Visual Computing, Sep. 14, 2017, 54 pgs.

Gardner, M. R. et al., "The Immersive Education Laboratory: understanding affordances, structuring experiences, and creating constructivist, collaborative processes, in mixed-reality smart environments", EAI Endorsed Transactions on Future Intelligent Educational Environments, Sep. 9, 2014, 13 pgs.
Heer, Jeffrey et al., "A Tour Through the Visualization Zoo", Communications of the ACM, vol. 53, No. 6, 2010, 9 pgs.
Heer, Jeffrey et al., "Animated Transitions in Statistical Data Graphics", IEEE Transactions on Visualization and Computer Graphics, vol. 13, No. 3, Nov./Dec. 2007, pp. 1240-1247.
Hollerer, Tobias et al., "Exploring MARS: Developing Indoor and Outdoor User Interfaces to a Mobile Augmented Reality System", Computers & Graphics, vol. 3, 1999, pp. 779-785.
Jacomy et al. "ForceAtlas2, a Continuous Graph Layout Algorithm for Handy Network Visualization Designed for the Gephi Software", PLOS One, vol. 9, No. 6, Jun. 10, 2014, Retrieved from: ForceAtlas2, a Continuous Graph Layout Algorithm for Handy Network Visualization Designed for the Gephi Software, 12 pgs.
Jarocsh, Rafael et al., "Interactive exploration of immersive illuminated 3D scatterplots ProjINF", retrieved from https://www.informatik.uni-stuttgart.de/studium/interessierte/bsc-studiengaenge/informatik/projekt-inf/2015-06-26/Gruppe_6.pdf, Jun. 26, 2015, 6 pgs.
Khairi et al., "Visualizing Large, Heterogeneous Data in Hybrid-Reality Environments", IEEE Computer Graphics and Applications, Jul./Aug. 2013, p. 38-48.
Knudsen, Jakob S., "Transparency and sorting in Unity", WordPress, Jul. 20, 2013, 9 pgs.
Luo, Xun, "PACE: A Framework for Personalized Visualization and Scalable Human Computer Interaction", Thesis of Xun Luo, 2008, 187 pgs.
Maddix, Karl, "Big Data VR Challenge—Winners!", printed from http://www.mastersofpie.com/big-data-vr-challenge-winners/ on Jun. 21, 2016, 17 pgs.
Maddix, Karl, "Big Data VR Challenge Phase 1", printed from http://www.mastersofpie.com/big-data-vr-challenge/ on Jun. 21, 2016, Jun. 1, 2015, 10 pgs.
Maddix, Karl, "Big Data VR Challenge Phase 2 Update", printed from http://www.mastersofpie.com/big-data-vr-challenge-phase-2-update/ on Jun. 21, 2016, Jun. 26, 2015, 14 pgs.
Marr, Bernard, "How VR Will Revolutionize Big Data Visualizations", retrieved from: http://www.forbes.com/sites/bernardmarr/2016/05/04/how-vr-will-revolutionize-big-data-visualizations/print/, May 4, 2016, 4 pgs.
Mashor, Mohd Y., "Improving the Performance of K-Means Clustering Algorithm to Position the Centres of RBF Network", International Journal of the Computer, The Internet and Management, vol. 6, No. 2, May-Aug. 1998, 15 pgs.
Milgram, Paul et al., "A Taxonomy of Mixed Reality Visual Displays", retrieved from http://vered.rose.utoronto.ca/people/paul_dir/IEICE94/ieice.html; IEICE Trans, on Info. Syst., vol. E77-D, No. 12, Dec. 12, 1994, on Oct. 16, 2003 15 pgs.
Moran, Andrew et al., "Improving Big Data Visual Analytics with Interactive Virtual Reality", arXiv:1506.08754v2 [cs.HC], Oct. 6, 2015, 6 pgs.
Nagel, Henrik R. et al., "Methods for Visual Mining of Data in Virtual Reality", In Proceedings of the International Workshop on Visual Data Mining, in conjunction with ECML/PKDD2001, 2nd European Conference on Machine Learning and 5th European Conference on Principles and Practice of Knowledge Discovery in Databases, 2001, 15 pgs.
Raja, Dheva et al., "Exploring the Benefits of Immersion in Abstract Information Visualization", Virginia Tech, Department of Computer Science, 2004, 7 pgs.
Shen, Cheney, "DirectCompute tutorial for Unity 2: Kernels and thread groups", Cheney Shen Technology Blog, 2018, 17 pgs.
Shyu et al., "A Novel Anomaly Detection Scheme Based on Principal Component Classifier", ICDM Foundation and New Direction of Data Mining Workshop, 2003, pp. 172-179.
St. John, Mark et al., "The Use of 2D and 3D Displays for Shape-Understanding versus Relative-Position Tasks", Human Factors: The Journal of the Human Factors and Ergonomics Society, 2001, pp. 79-98.

(56) References Cited

OTHER PUBLICATIONS

Swalin, Alvira, "CatBoost vs. Light GBM vs. XGBoost", Towards Data Science, Mar. 13, 2018, 11 pgs.
Takahashi, Dean, "CastAR will return $1Min Kickstarter money and postpone augmented reality glass shipments", printed from http://venturebeat.com/2015/12/16/castar-will-return-1m-in-kickstarter-money-and-postpone-augmented-reality-glasses-shipments/ on May 19, 2016, 7 pgs.
Takahasi, Dean, "CastAR shows how it will turn your tabletop into an animated gaming world", printed from http://venturebeat.com/2016/04/11/castars-latest-demos-show-how-it-plans-to-enable-tabletop-mixed-reality-games/ on May 19, 2016, 8 pgs.
Tanriverdi, Vildan et al., "VRID: A Design Model and Methodology for Developing Virtual Reality Interfaces", VRST'01, Nov. 15-17, 2001, 8 pgs.
The Uber Maker, "How to: Connect your Wimote to your computer via Bluetooth", retrieved from http://www.instructables.com/id/How-To-Connect-your-Wiimote-to-your-PC-via-Blueto/ in 2016, 6 pgs.
Tollerud, Erik, "An Analysis of 3D Data Visualization in Numerical Models", 2006, 24 pgs.
Tulloch, Andrew, "Fast and Randomized SVD", facebook Research, Retrieved from: https://research.fb.com/fast-randomized-svd/, Sep. 22, 2014, 7 pgs.
Vanderplas, Jake, "In Depth: k-Means Clustering", Python Data Science Handbook, Excerpt Retrieved from: https://jakevdp.github.io/PythonDataScienceHandbook/05.11-k-means.html, 2017, 16 pgs.
White, Sean et al., "Visual Hints for Tangible Gestures in Augmented Reality", Proceedings of the Sixth IEEE and ACM International Symposium on Mixed and Augmented Reality, Nov. 13-16, 2007, pp. 47-50.
White Paper Intel Labs, "ScienceSim: A virtual environment for collaborative visualization and experimentation", Intel Labs, Intel Corporation, 2009, 5 pgs.
Wilhelm, Parker, "Microsoft HoloLens Bluetooth Clicker is our first glimpse at a possible controller", printed from http://www.techradar.com/us/news/wearables/microsoft-s-hololens-bluetooth-clicker-is-our-first-glimpse-at-any-controller-1315623 on Jun. 25, 2016, Feb. 23, 2016, 10 pgs.
Zucconi, Alan, "Arrays & Shaders in Unity 5.4+", WordPress. Oct. 24, 2016, 14 pgs.
Accord.NET Framework, Retrieved from: https://web.archive.org/web/20180910115347/http://accord-framework.net/, Sep. 10, 2018, 12 pgs.
International Preliminary Report on Patentability for International Application PCT/US2016/053842, Report dated Mar. 27, 2018, dated Apr. 5, 2018, 10 Pgs.
International Search Report and Written Opinion for International Application No. PCT/US2016/053842, Search completed Jan. 11, 2017, dated Jan. 11, 2017, 12 Pgs.
"3D Visualization Perspective for PDI 4—Pentaho Data Mining—Pentaho Wiki", printed from http://wiki.pentaho.com/display/DATAMINING/3D+Visualization+Perspective+for+PDI+4 on May 25, 2016, 5 pgs.
"Amra46p", printed from http://i.imgur.com/aMRA46p.png on May 19, 2016, 1 pg.
"Case Study: Ecommerce Website", YouTube, Retrieved from: https://www.youtube.com/watch?v=iYAKcXJ9Ask, Published May 19, 2017, 1 pg.
"CastAR Wand", printed from https://s3.amazonaws.com/ksr/assets/001/081/488/765f86d82ae5f37a5d4d0a27dad4534b_large.jpg?1381537591 on May 19, 2016, 1 pg.
"Documentation for BestHTTP", May 2018, 46 pgs.
"Fintech Innovation Lab NY Presents: Virtualitics", YouTube, Retrieved from: https://www.youtube.com/watch?v=giQj07HI0SM, Published Aug. 3, 2018, 1 pg.
"Framework modules", Accord.NET Framework, Retrieved from: http://accord-framework.net/docs/html/R_Project_Accord_NET.htm, Apr. 27, 2017, 17 pgs.
"Histrograms and Binning", H20.ai, Retrieved from: https://web.archive.org/web/20180403144856/http://docs.h2o.ai/h2o/latest-stable/h2o-docs/data-science/gbm-faq/histograms_and_binning.html, Apr. 3, 2018, 3 pgs.
"How to draw a covariance error ellipse", Computer vision for dummies, 2014, 50 pgs.
"InterSense, Precision Motion Tracking Solutions, IS-900 System", printed from http://www.intersense.com/pages/20/14 on May 19, 2016, 2 pgs.
"Introduction, The Accord.NET Image Processing and Machine Learning Framework", .NET Framework, Retrieved from: https://web.archive.org/web/20180423094320/http://accord-framework.net/intro.html, Apr. 23, 2018, 5 pgs.
"Machine learning for C#.Net", GitHub, Inc., Retrieved from: https://web.archive.org/web/20180509150200/https://github.com/mdabros/SharpLearning, May 9, 2018, 3 pgs.
"Magic Wand—Programmable TV Remote", printed from http://www.thinkgeek.com/product/cf9b/ on May 19, 2016, 4 pgs.
"Math.NET Numerics", Retrieved from: https://web.archive.org/web/20150217042219/http://numerics.mathdotnet.com:80/, Feb. 17, 2015, 7 pgs.
"Math.NET Numerics", Wkipedia, Retrieved from: https://en.wikipedia.org/wiki/Math.NET_Numerics, Last Modified Nov. 2, 2017, 2 pgs.
"Math.NET Numerics for .NET and Mono", Retrieved from: https://web.archive.org/web/20091211190916/https://numerics.mathdotnet.com/, Dec. 11, 2009, 3 pgs.
"MIConvexHull, A.Net fast convex hull library for 2,3, and higher dimensions", GitHub Pages, 2018, 3 pgs.
"Model Random Forest for classification, implementation on c#", Developers Club, greek daily blog, Retrieved from: http://developers-club.com/posts/215453/, Mar. 2014, 35 pgs.
"OpenWERX Data Science Hackathon—Bounty Hunter—First Place!", YouTube, Retrieved from; https://www.youtube.com/watch?v=5O2KXVEcMIA, Published May 13, 2017, 1 pg.
"OriginLab", OriginLab Corporation, Accessed 2018, 3 pgs.
"PPT Wand—EST, Engineering Systems Technologies GmbH & Co. KG", printed from http://www.est-kl.com/es/products/motion-tracking/worldviz/ppt-wand.html on May 19, 2016, 4 pgs.
"PrincipleComponentAnalysis Class", Accord.NET Framework, Retrieved from: https://web.archive.org/web/20180327041531/http://accord-framework.net/docs/html/T_Accord_Statistics_Analysis_PrincipalComponentAnalysis.htm, Mar. 27, 2018, 11 pgs.
"Scikit-learn", scikit-learn, Retrieved from: https://web.archive.org/web/20180506040737/http://scikit-learn.org/stable/, May 6, 2018, 3 pgs.
"Scikit-learn user guide, Release 0.20.0", scikit-learn developers, Sep. 27, 2018, 2373 pgs.
"Steal this idea: VR Wand", printed from https://forums.oculus.com/community/discussion/1620/steal-this-idea-vr-wand on May 19, 2016, 21 pgs.
"Unity User Manual (2018.2)", Unity Technologies, 2018, 5 pgs.
"Virtual Reality: Input devices. Technologies for the direct interaction", Curs 2012/2013, 86 pgs.
"Virtual Reality: Interface Devices", printed from http://archive.ncsa.illinois.edu/Cyberia/VETopLevels/VR.Interface.html on May 19, 2016, 3 pgs.
"Virtualitics—Immerse yourself in your data!", VirtualiticsVR, YourTube, Retrieved from: https://www.youtube.com/watch?v=YkoTfENJxL4, Published Feb. 12, 2018, 1 pgs.
"VR Wand/Stylus Concept", printed from https://www.reddit.com/r/oculus/comments/22mzis/vr_wandstylus_concept/ on May 19, 2016, 4 pgs.
Alger, Mike, "Visual Design Methods for Virtual Reality", Sep. 2015, 98 pgs.
Barczak, Joshua, "Why Geometry Shaders Are Slow (Unless you're Intel)", The Burning Basis Vector, Omega WordPress, Mar. 18, 2015, 20 pgs.
Brath, Richard, "3D InfoVis is Here to Stay: Deal with It", IEEE VIS International Workshop on 3DVis, 2014, 7 pgs.
Breiman, Leo, "Random Forests", University of California Berkeley, Statistics Department, Jan. 2001, 33 pgs.

(56) References Cited

OTHER PUBLICATIONS

Cabral, Marcio C. et al., "On the usability of gesture interfaces in virtual reality environments", CLIHC '05 Proceedings of the 2005 Latin American conference on Human-computer interaction, Oct. 2005, 10 pgs.

Chandler, Tom et al., "Immersive Analytics", IEEE, 2015, 8 pgs.

Chen, Jim X., "Data Visualization and Virtual Reality", Handbook of Statistics, vol. 24, 2005, 25 pgs.

Cioc, Alex, "Immersing Yourself in Your Data: Using Virtual World Engines to Solve "Big" Data", printed from http://www.astrobetter.com/blog/2013/03/25/immersing-yourself-in-your-data/ on Jun. 25, 2016, Mar. 25, 2013, 6 pgs.

Cruz-Neira, Carolina et al., "Scientists in Wonderland: A Report on Visualization Applications in the CAVE Virtual Reality Environment", IEEE, 1993, pp. 59-66.

De Haan, Gerwin et al., "Towards Intuitive Exploration Tools for Data Visualization in VR", VRST '02, Nov. 11-13, 2002, 8 pgs.

Denise, Leon, "Tutorial: Processing Point Cloud Data with Unity", Sketchfab, Feb. 16, 2017, 41 pgs.

Djorgovski, S. G. et al., "Immersive Data Visualization", AstroInformatics 2012, Redmond, WA, Sep. 2011, 8 pgs.

Djorgovski, S. G. et al., "The MICA Experiment: Astrophysics in Virtual Worlds", SLACTIONS 2012 International Research Conference on Virtual Worlds, eds. L. Morgado, Y. Sivan, A.M. Maia, et al., 2012, pp. 49-57.

Djorgovski et al., "Immersive and Collaborative Data Visualization Using Virtual Reality Platforms", 2014 IEEE International Conference on Big Data, Oct. 27-30, 2014, pp. 609-614.

Donalek, Ciro et al., "Immersive and Collaborative Data Visualization Using Virtual Reality Platforms", IEEE, 2014, 6 pgs.

Donalek, Ciro et al., "Striving for Effective High-Dimensional Data Visualization and Exploration Using Immersive Virtual Environments", Center for Data-Driven Discovery, California Institute of Technology, 6 pgs.

Extended European Search Report for Application No. 16849900.2, Report dated Feb. 20, 2019, 7 pgs.

International Search Report and Written Opinion for International Application No. PCT/US2018/051394, Search completed Dec. 3, 2018, dated Dec. 13, 2018, 14 Pgs.

"Extracts of ENVI User's Guide", ENVI EX, Retrieved from: http://www.harrisgeospatial.com/portals/0/pdfs/enviex/ENVI_EX_User_Guide.pdf, Dec. 2009, 275 pgs.

"Output Formats", Graphviz, Retrieved from: https://graphviz.gitlab.io/_pages/doc/info/output.html#d:gv, Printed on Aug. 10, 2018, 16 pgs.

"UIElement.Visibility Property", Microsoft, Retrieved from: https://docs.microsoft.com/en-us/dotnet/api/system.windows.uielement.visibility?view=netframework-4.7.2, Nov. 17, 2011, Printed Apr. 5, 2019, 3 pgs.

\* cited by examiner

SYSTEMS AND METHODS FOR HIGH DIMENSIONAL 3D DATA VISUALIZATION

CROSS-REFERENCE TO RELATED APPLICATIONS

The current application claims priority under 35 U.S.C. 119(e) to U.S. Provisional Patent Application Ser. No. 62/671,378, entitled "Systems and Methods for High Dimensional 3D Data Visualization", filed May 14, 2018. The disclosure of U.S. Provisional Patent Application Ser. No. 62/671,378 is incorporated herein by reference in its entirety.

FIELD OF THE INVENTION

This invention generally relates to the visualization of data, and specifically to the insightful visualization of highly dimensional data at a large scale.

BACKGROUND

Three-dimensional (3D) computer graphics are graphics that use a three-dimensional representation of geometric data stored in memory for the purposes of performing calculations and rendering 2D images. Conventional computer displays are capable of rendering a 2D image that gives the appearance of depth. Recently, Virtual Reality (VR) and Augmented Reality (AR) devices have been developed that simulate depth using stereoscopy, where different viewpoints of the same scene are displayed to the left and right eyes, such as the Vive, by HTC, or the Oculus Rift, by Oculus VR.

Data visualization using computer systems involves displaying data as a graphical representation of the data and is an important tool for data analysis. 3D computer graphic techniques have recently been used to try and represent large data sets in ways that are understandable by human users. Virtual reality has begun to be used to present 3D data to users.

SUMMARY OF THE INVENTION

Systems and methods for high dimensional 3D data visualization in accordance with embodiments of the invention are illustrated. One embodiment includes a data visualization system including at least one processor, at least one graphics processing module, and a memory including a data visualization application, where the data visualization application directs the at least one processor to obtain data including a set of records, where each record has at least three data dimensions, generate at least one mapping from the at least three data dimensions to a set of visualization dimensions, where the mapping includes, a set of visualization parameters describing visualization dimension values assigned to records in the set of records, and individual visualization dimension values are assigned to a given record from the set of records based upon a value of the data dimension mapped to the associated visualization dimension for the given record, generate a 3D mesh object, where the 3D mesh object includes, a list of vertices including location information describing a set of vertices, where each vertex represents at least one record, and a list of indices including visualization information on how a 3D point object located at a corresponding vertex should be visualized based on the visualization parameters, and render the 3D point objects in a virtual 3D environment using the graphics processing module and the 3D mesh object, where the graphics processing module renders the 3D point objects in parallel.

In another embodiment, the data visualization application further directs the at least one processor to automatically generate the mapping of the data.

In a further embodiment, to generate the least one mapping, the data visualization application further directs the at least one processor to identify a target dimension from the at least three data dimensions, calculate ranking metrics reflecting the impact of the non-target dimensions the target dimension, calculate correlation coefficients reflecting to what degree the remaining dimensions are correlated, and generate the set of visualization parameters based on the ranking metrics and the correlation coefficients.

In still another embodiment, to calculate ranking metrics, the data visualization application further directs the processor to apply a machine learning model.

In a still further embodiment, the machine learning model is a random forest.

In yet another embodiment, the data visualization application further directs the processor to apply histogram-based splitting in the random forest.

In a yet further embodiment, the correlation coefficients are Pearson correlation coefficients.

In another additional embodiment, the data visualization application further directs the processor to select a chart type that attempts to best provide insights with respect to the target dimension to a human.

In a further additional embodiment, the chart type is selected from the group consisting of: scatter plots, histograms, swarm plots, bar charts, heat maps, topographic maps, geospatial visualizations, and network visualizations.

In another embodiment again, the 3D virtual environment is a 3D virtual office.

In a further embodiment again, a method for data visualization includes obtaining data including a set of records, where each record has at least three data dimensions, generating at least one mapping from the at least three data dimensions to a set of visualization dimensions, where the mapping includes a set of visualization parameters describing visualization dimension values assigned to records in the set of records, and individual visualization dimension values are assigned to a given record from the set of records based upon a value of the data dimension mapped to the associated visualization dimension for the given record, generating a 3D mesh object, where the 3D mesh object includes, a list of vertices includes location information describing a set of vertices, where each vertex represents at least one record, and a list of indices including visualization information on how a 3D point object located at a corresponding vertex should be visualized based on the visualization parameters, and rendering the 3D point objects in a virtual 3D environment using the graphics processing module and the 3D mesh object, where the graphics processing module renders the 3D point objects in parallel.

In still yet another embodiment, the method further includes automatically generating the mapping of the data.

In a still yet further embodiment, generating the at least one mapping further includes identifying a target dimension from the at least three data dimensions, calculating ranking metrics reflecting the impact of the non-target dimensions the target dimension, calculating correlation coefficients reflecting to what degree the remaining dimensions are correlated, and generating the set of visualization parameters based on the ranking metrics and the correlation coefficients.

In still another additional embodiment, calculating ranking metrics further includes applying a machine learning model.

In a still further additional embodiment, the machine learning model is a random forest.

In still another embodiment again, the method further includes applying histogram-based splitting in the random forest.

In a still further embodiment again, the correlation coefficients are Pearson correlation coefficients.

In yet another additional embodiment, the method further includes selecting a chart type that attempts to best provide insights with respect to the target dimension to a human.

In a yet further additional embodiment, the chart type is selected from the group consisting of: scatter plots, histograms, swarm plots, bar charts, heat maps, topographic maps, geospatial visualizations, and network visualizations.

In yet another embodiment again, a data visualization system includes at least one processor, at least one graphics processing module, and a memory including a data visualization application, where the data visualization application directs the at least one processor to obtain data including a set of records, where each record has at least three data dimensions, identify a target dimension from the at least three data dimensions, calculate ranking metrics reflecting the impact of the non-target dimensions the target dimension, calculate correlation coefficients reflecting to what degree the remaining dimensions are correlated, select a subset of the at least three data dimensions including the target dimension and at least one of the remaining dimensions based on the ranking metrics and the correlation coefficients such that the cardinality of the subset of the at least three data dimensions is at or below a dimensionality threshold, generate at least one mapping from the dimensions in the subset of the at least three data dimensions to a set of visualization dimensions, where the mapping includes a set of visualization parameters describing visualization dimension values assigned to records in the set of records, and individual visualization dimension values are assigned to a given record from the set of records based upon a value of the data dimension mapped to the associated visualization dimension for the given record, generate a 3D mesh object, where the 3D mesh object includes a list of vertices including location information describing a set of vertices, where each vertex represents at least one record, and a list of indices including visualization information on how a 3D point object located at a corresponding vertex should be visualized based on the visualization parameters, and render the 3D point objects in a virtual 3D environment using the graphics processing module and the 3D mesh object, where the graphics processing module renders the 3D point objects in parallel.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
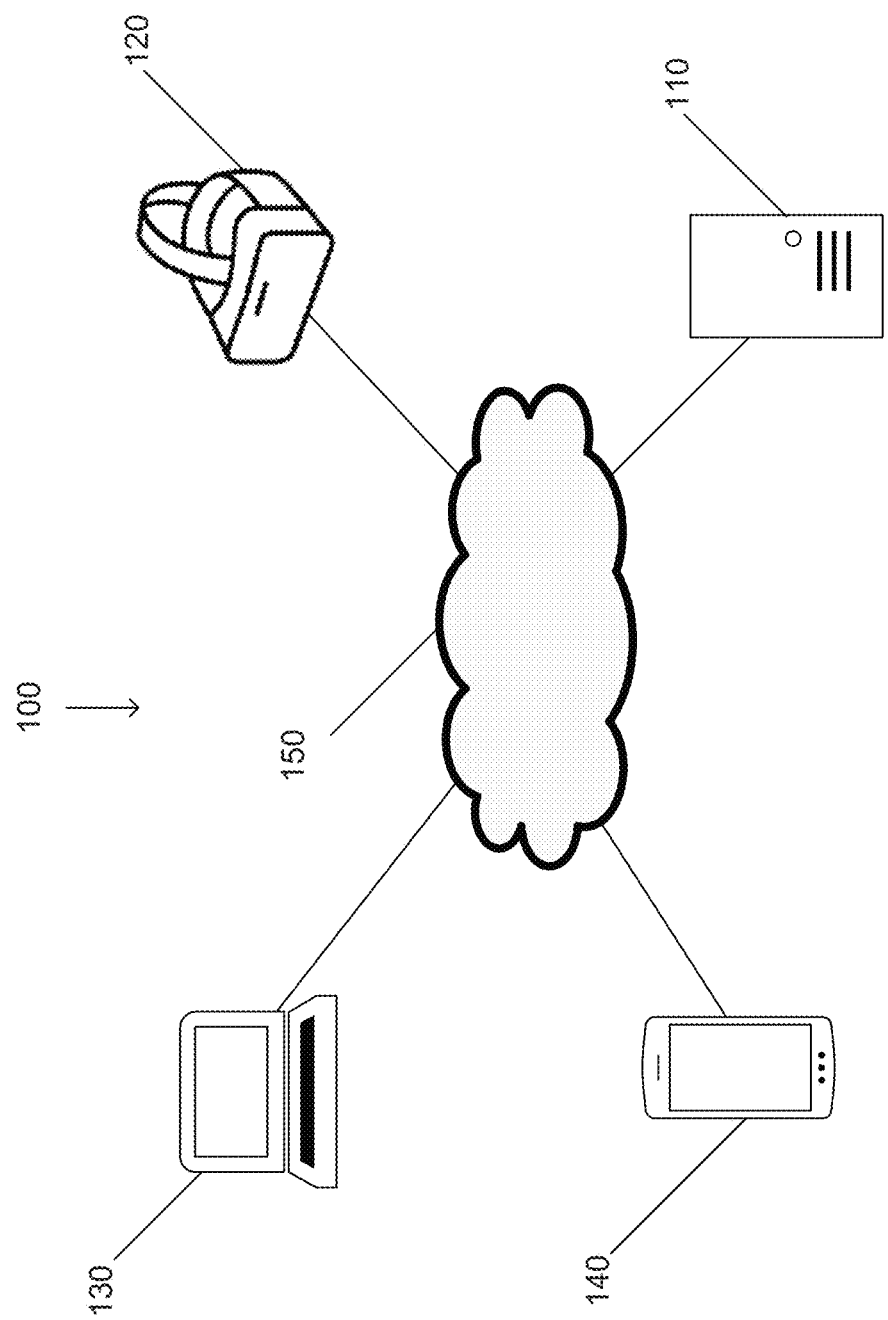
FIG. 1 is a network diagram for a data visualization system in accordance with an embodiment of the invention.

DETAILED DESCRIPTION 3D data visualization systems are built to enable users to understand their data in intuitive, visual ways. By interacting with data visually, the human mind is capable of using its significant pattern recognition abilities to make sense of data. However, 3D rendering, and especially rendering images for Virtual Reality (VR), Augmented Reality (AR), and Mixed Reality (MR) systems takes a significant amount of computing power. In the age of Big Data, data sets that are increasingly large and complex are becoming both invaluable and readily available. However, as the complexity and volume of a dataset increases, so too does the processing power required to visualize the data.

This issue presents multiple challenges for the effective usage and visualization of data. With respect to visualizing large data sets, as the number of objects that need to be rendered increases, the time to render the view increases, and by extension the framerate for dynamic viewing tends to decrease, as the computer requires more and more time to render each object. Further, as the dimensionality of the data increases, it becomes increasingly difficult for users to find representations of the data that are both useful and intuitive. The dimensionality of data can be understood as the number of parameters, or features, associated with each data item (e.g. a row in a table is a data item, also called a "record", and the number of columns is the number of dimensions or vice versa). Data visualization processes described can both allow for large volumes of high-dimensional data to be rendered in a 3D environment and can generate valuable insights into user data along with appropriate visualizations for human consumption.

An important distinction is dimensionality of data (the number of dimensions that a dataset contains), and the dimensionality of the display (number of dimensions that can be reasonably rendered). A piece of paper, for example, is exemplary of a 2D display. Conventional computer screens are typically considered 2D, although the impression of 3D can be given through perspective effects. VR headsets are considered 3D displays as they present an immersive 3D experience. One issue with visualizing highly dimensional data is maximizing the number of dimensions that can be reflected given the limitations of the dimensionality of the display. For example, 3D data can trivially be represented using a traditional coordinate system (x,y,z). Color of the point at (x,y,z) could indicate a 4th dimension; shape may represent a $5^{th}$; vibrations may represent a $6^{th}$, and so on. As such, increasing the dimensionality of the display is an easy way to increase the number of dimensions that can be intuitively represented. It is therefore desirable to enable data to be visualized using 3D displays such as VR headsets, despite increased computational costs. In rendering high dimensional data, each data point may require a separate visual identifier for each dimension that is to be rendered. As such, not only can visualizing data require many individual points, but each point may need to be unique.

Traditionally, 3D objects are rendered as a set of polygons (usually triangles). Rendering large amounts of polygons is a concern not only for data visualization, but also in real-time simulations such as video games. Video games are most often concerned with providing high-fidelity representations of virtual worlds. For example, a video game environment may need to model grass on a hill. While blades of grass are interpreted by players as individual objects, they may be rendered as a single graphics object that is rendered as a single entity. Alternatively, they may be procedurally generated according to an algorithm to reduce file size and stress on the processor. However, representing data points, while they may be as numerous as blades of grass on a hill, are all discreet and can be unique and often must be represented as such in order to provide valuable insights. Data visualization systems can leverage specialized visualization data structures to reduce computational load by increasing the efficiency the rendering process, leveraging different types of hardware and reducing the overall computational load on the system.

Further, data visualization processes can utilize machine learning algorithms applied to visualization data structures to determine visualization parameters that most effectively provide insight into the data, and to suggest meaningful correlations for further investigation by users. In numerous embodiments, data visualization processes can automatically generate parameters that can be used to display the data in ways that will provide enhanced value. For example, dimensions can be chosen to be associated with specific visualization parameters that are easily digestible based on their importance, e.g. with higher value dimensions placed on more easily understood visualization aspects (color, coordinate, size, etc.). In a variety of embodiments, data visualization processes can automatically describe the graph using natural language by identifying regions of interest in the visualization, and generating text using natural language generation processes. As such, data visualization processes can allow for rapid, effective use of voluminous, high dimensional data sets. Systems for performing data visualization processes in accordance with various embodiments of the invention are described below.

Data Visualization Systems

Data visualization systems can be implemented using a variety of architectures, from single computing devices to distributed computing systems. In numerous embodiments, multiple user interface devices can be connected to enable multiple users to interact with the data and with each other in a virtual environment. In many embodiments, the distribution of computational activity is dependent upon the number of users interacting with the visualization.

A data visualization system in accordance with an embodiment of the invention is illustrated in FIG. 1. Data visualization system 100 includes a data visualization computer system 110. Data visualization computer systems can be implemented using a variety of different hardware. For example, personal computers, servers, server systems (e.g. cloud computing architectures), could be used as a data visualization computer system. In numerous embodiments, data visualization computer systems can leverage distributed computer hardware. Data visualization computer systems can perform data visualization processes including, but not limited to, those discussed in below sections.

Data visualization system 100 further includes a number of user interface devices, such as a VR display 120, a computer terminal 130, and smartphone 140. Example VR displays can be, but are not limited to, VR headsets such as the Oculus Rift, HTC Vive, or the Google Cardboard, AR displays such as the Microsoft Hololens, and/or MR displays such as Windows Mixed Reality Headsets. In many embodiments, user interface devices include a display capable of rendering high dimensional data in accordance with data visualization processes. In a variety of embodiments, user interface devices enable users to set visualization parameters, manipulate the view point of the visualization, and/or access generated insights. Data visualization systems can provide different viewpoints of the same visualization to each connected user interface device, and/or provide the same viewpoint to two or more user interface devices.

Data visualization computer system 100 is connected to interface devices via a network 150. Network 150 can be a wired network, a wireless network, and/or a mixed medium network. Example network implementations and frameworks include, but are not limited to, wide area networks, local area networks, personal area networks, the Internet, Bluetooth, or any other communication protocol and/or network architecture as appropriate to the requirements of a given application.

As can be readily appreciated, and number of architectures can be used, such as, but not limited to, architectures that involved distributed computing platforms, different numbers of user interface devices, and/or any other implementation that may be appropriate to the requirements of a given application. Data visualization systems are capable of performing data visualization processes. Data visualization computer systems designed to run data visualization processes are discussed below.

Data Visualization Computer Systems

As noted above, data visualization computer systems are capable of performing data visualization processes. While below is a discussion of an exemplary data visualization system implemented using a single computing device, in numerous embodiments, data visualization computer systems are implemented using distributed architectures. The specific architecture can change based on the processing power required and the number of users that are designed to interact with the system.

Figure 2:
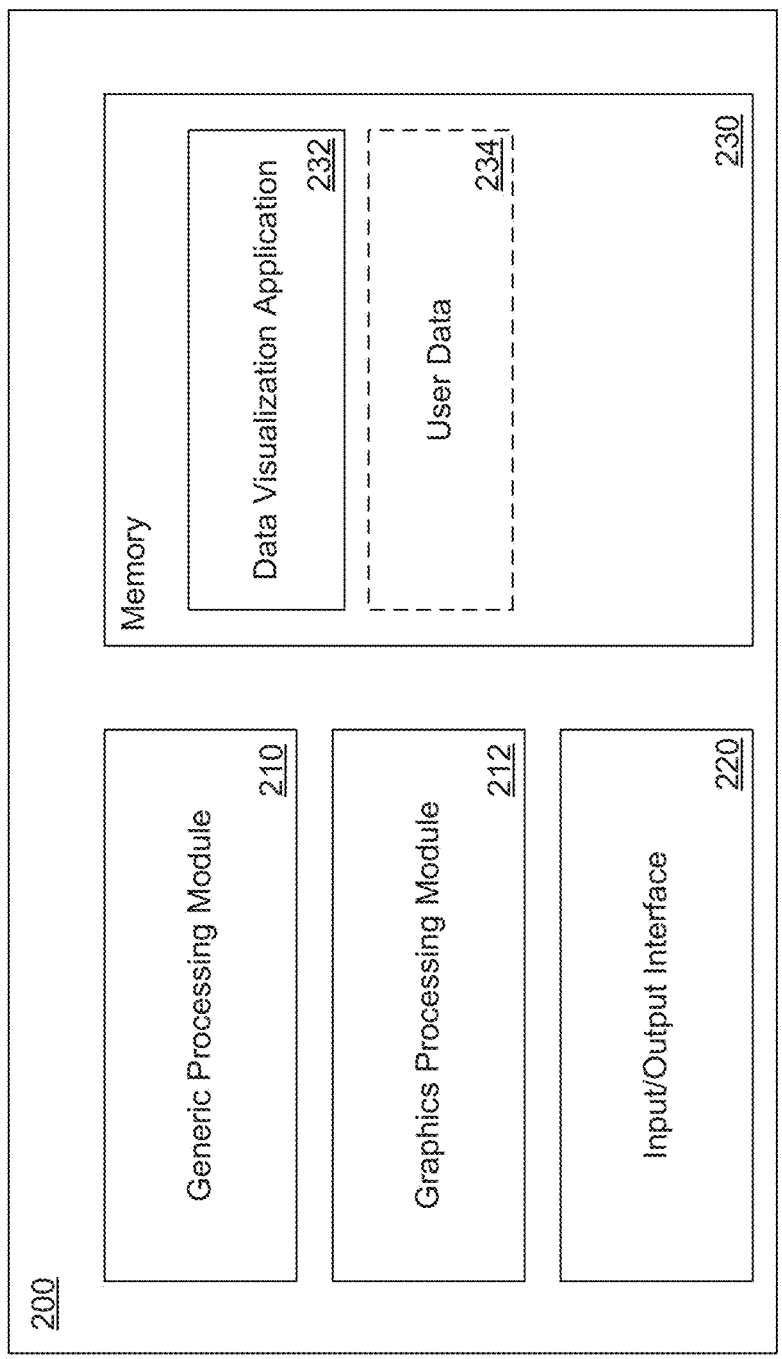
FIG. 2 conceptually illustrates a data visualization system implemented on a single computing device in accordance with an embodiment of the invention.

A data visualization computer system implemented on a single computing device in accordance with an embodiment of the invention is illustrated in FIG. 2. Data visualization computer system 200 includes a generic processing module 210 and a graphics processing module 212. In numerous embodiments, generic processing modules are general purpose processors such as a Central Processing Unit (CPU). Graphics processing modules are processors architected to excel at numerous, parallelizable functions such as rendering images including, but not limited to, GPUs. In some embodiments, generic processing module 210 and graphics processing module 212 can be implemented using the same processing circuitry and/or using more than two processing components. As can readily be appreciated, data visualization computer systems can take advantage of the capabilities of different processor configurations to optimize computational resources.

Data visualization computer system 200 includes an input/output (I/O) interface 220. I/O interface can connect to user interface devices such as a VR headset, or a 2D display. In numerous embodiments, displays can be completely integrated into the data visualization computer system. In many embodiments I/O interfaces enable communications with distributed computing hardware, the acquisition of user data to visualize, and/or obtaining visualization parameters. As one can readily appreciate, any number of I/O circuitries can be used, including multiple types of I/O interfaces that are specialized for communication with different types of devices.

Data visualization computer system 200 further includes a memory 230. Memory 230 can be any type of memory, such as volatile memory or non-volatile memory. Memory 230 contains a data visualization application 232. Data visualization applications can configure generic processing modules and graphics processing modules to perform data visualization processes. In many embodiments, data visualization applications can determine what hardware is available, and optimize performance of the data visualization application by utilizing specialized data structures that can take advantage of different hardware. Memory 230 can further include user date 234 acquired from a user interface device.

As can readily be appreciated, any number of system designs can be used to enable a computer system to perform a data visualization processes. For example, in numerous embodiments, data visualization computer systems may include multiple generic processing modules and/or graphics processing modules. Data visualization processes capable of being performed by data visualization computer systems are discussed below.

Data Visualization Processes for Rendering Large Scale, High Dimensional Data

Data visualization processes in accordance with many embodiments of the invention can be used to render and/or suggest optimized visualizations of large scale, high dimensional data. In numerous embodiments, data processes include sets of rules which enable computers to more efficiently visualize data (e.g. more rendered points in less time). Data visualization processes for rendering data can achieve higher efficiency by packaging ingested data into data structures that can leverage different types of processor architectures. In numerous embodiments of the invention, graphics processing modules can be more effective at drawing 3D objects, and generic processing modules are more effective at placing 3D objects. With this in mind, different types of meshes can be used to increases processing speed.

Figure 3:
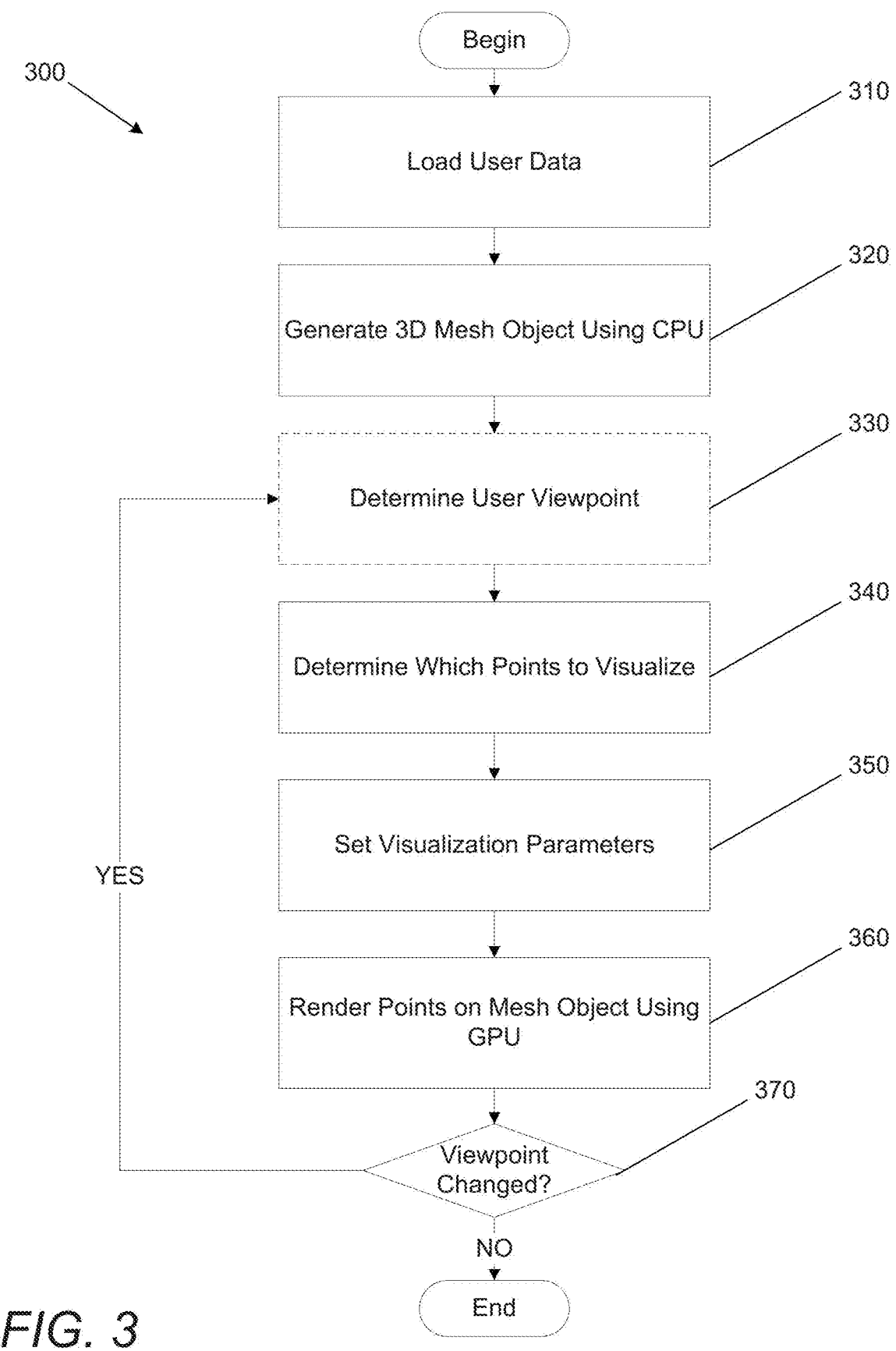
FIG. 3 is a flowchart illustrating a data visualization process for rendering data in a 3D environment in accordance with an embodiment of the invention.

Turning now to FIG. 3, a data visualization process for rendering points in accordance with an embodiment of the invention is illustrated. Process 300 includes loading (310) user data. In numerous embodiments, user data includes a set of data organized into a parsable data structure such as, but not limited to, a table. For example, a csv file, a Microsoft Excel file, or any other sort of uniformly delimited file format (tab delimited, for example) can be used. In many embodiments, databases can be used as an input to the system. E.g. SQL-like queries can be used to extract data from a database for processing. Further, proprietary file formats or user data configurations can be utilized with data visualization processes by preprocessing the data to a configuration that will work with the specific implementation. In addition, preprocessing can be used to identify salient data within unstructured data as appropriate to the requirements of a given application.

From the user data, a 3D mesh object can be generated (320) using the generic processing unit. In a variety of embodiments, the 3D mesh object is generated using several steps (which will be further illustrated with respect to FIG. 4 below). User data can be stored in system memory, and a set of pointers can be generated that point to each data item. These pointers can be bound into separate data item data structures which may contain additional information, such as, but not limited to, visualization parameters, classifications, or any other parameter that can be used as appropriate to the requirements of a given application. In many embodiments, the data item data structures are aggregated into a mesh generation data structure. Mesh generation data structures can be implemented in any number of ways, including, but not limited to, as a vector of data item data structures, a vector of pointers to data item data structures, or as a variant of any other aggregative data structure format. In some embodiments, mesh generation data structures forego aggregating data item data structures and directly aggregate the pointers to the user data. Mesh generation data structures can include a list of vertices and a list of indices. A list of vertices contains location information for where each vertex in the mesh should be placed. A list of indices contains visualization information on how the associated vertex should be visualized. Some embodiments utilize multiple mesh generation data structures that include some, but not all of the above data and/or data structures. For example, some mesh generation data structures may only include a list of vertices.

Figure 5:
FIG. 5 is a screenshot of a 3D placement mesh in accordance with an embodiment of the invention.

A 3D mesh object can be generated using the generic processing unit by instructing the processor to place points at listed vertices reflecting the location of the points in the current 3D environment. This can be achieved by passing the entire mesh generation data structure to the central processing unit, or by iteratively stepping through the list of vertices. While a sample drawing of a 3D mesh object in accordance with an embodiment of the invention is illustrated in FIG. 5 for exemplary purposes, in numerous embodiments, the mesh itself is not visually rendered, and merely reflects points in space stored by the computer system.

In numerous embodiments, the viewpoint of the user is determined (330). The user's viewpoint may be based upon the user's line of sight as calculated by a VR system. In many embodiments, the user's viewpoint may be the viewpoint of viewing a 2D display. Different culling models can be used to determine which points would be viewable by the user based on the 3D mesh object in 3D space. For example, occlusion culling, frustum culling, or any other culling method may be used to reduce future computational load with respect to rendering points.

In determining (340) which points to visualize, points that have been culled may not be visualized to reduce computational load. In many embodiments, points that have been deselected by a user may not be rendered. E.g., if a data set comprises a listing of persons with cats and a listing of persons with dogs, a user may selectively chose to only render those points representing persons who have both cats and dogs, only dogs, only cats, etc. In many embodiments, information describing which points should be visualized is stored in the list of indices. An entry in the list of indices may have a visualization parameter which reflects whether or not the point is "on" or "off," i.e. should be rendered or not. Visualization parameters can be set (350) by manipulating the entries in the list of indices. In numerous embodiments, visualization parameters include on/off parameters, shape parameters, animation parameters (such as those that describe pulsing, stretching, and/or any other animation of a particular point), color parameters, sound parameters, size parameters, Normal parameters (i.e. normal mapping), brightness parameters, transparency parameters, texture parameters (UVs), halo parameters (describing light effects around a point), vector fields, and/or any other parameter which can be used to control rendering to reflect a dimension of the data. In some embodiments, a dimension can be a geospatial coordinate reflecting a location on a map, such that representations data can be overlaid onto a representation of the map and/or other representation of the location. Each entry in the list of indices can include none, some, or all types of visualization parameters available in the system. Each entry in the list of indices can describe a single vertex in the mesh, or a set of vertices in the mesh. In some embodiments, the list of indices includes a separate data structure for each data item. In a variety of embodiments, the list of indices includes a pointer to each data structure describing a data item.

Figure 6:
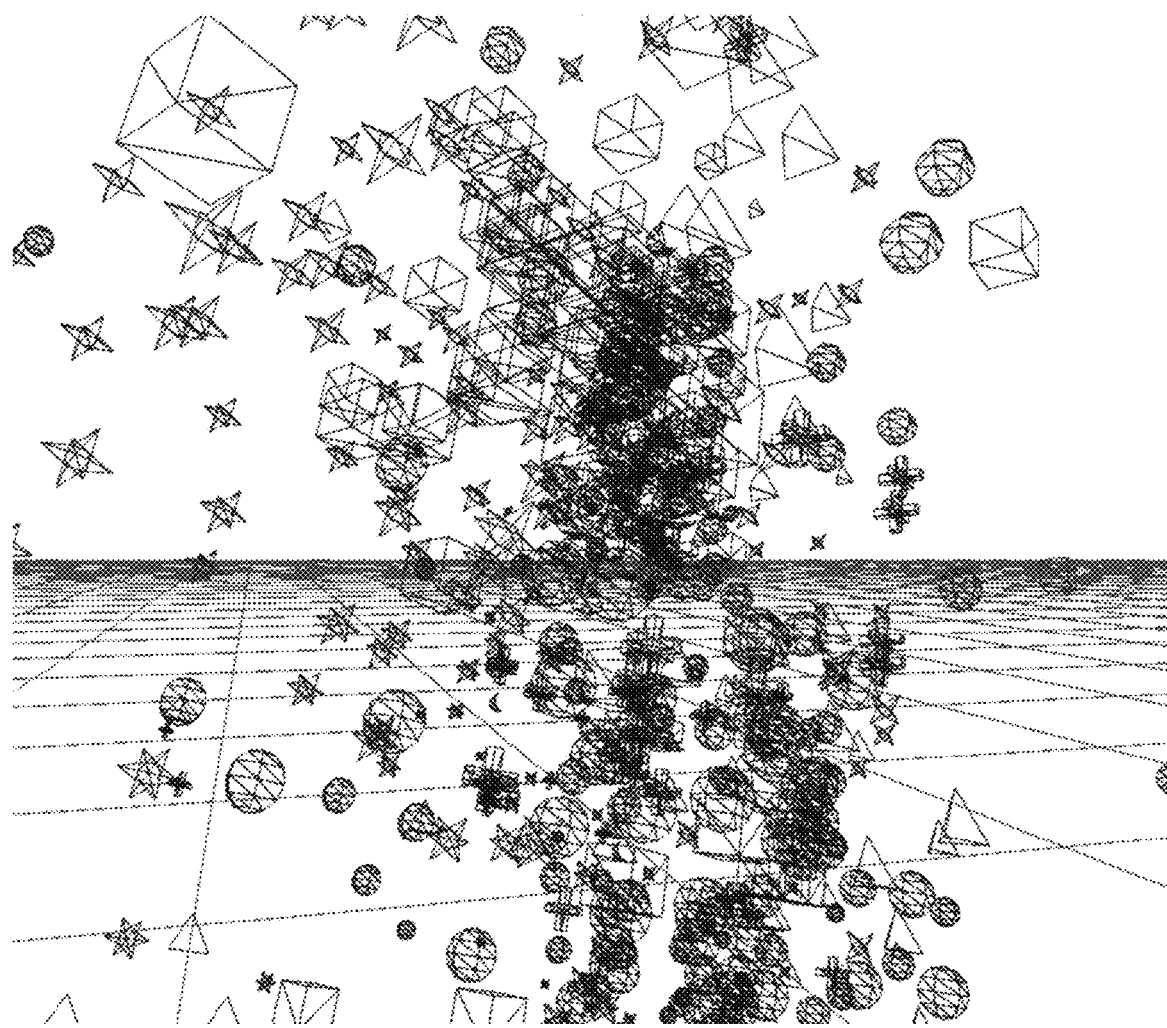
FIG. 6 is a screenshot of a rendered wireframe in accordance with an embodiment of the invention.
Figure 7:
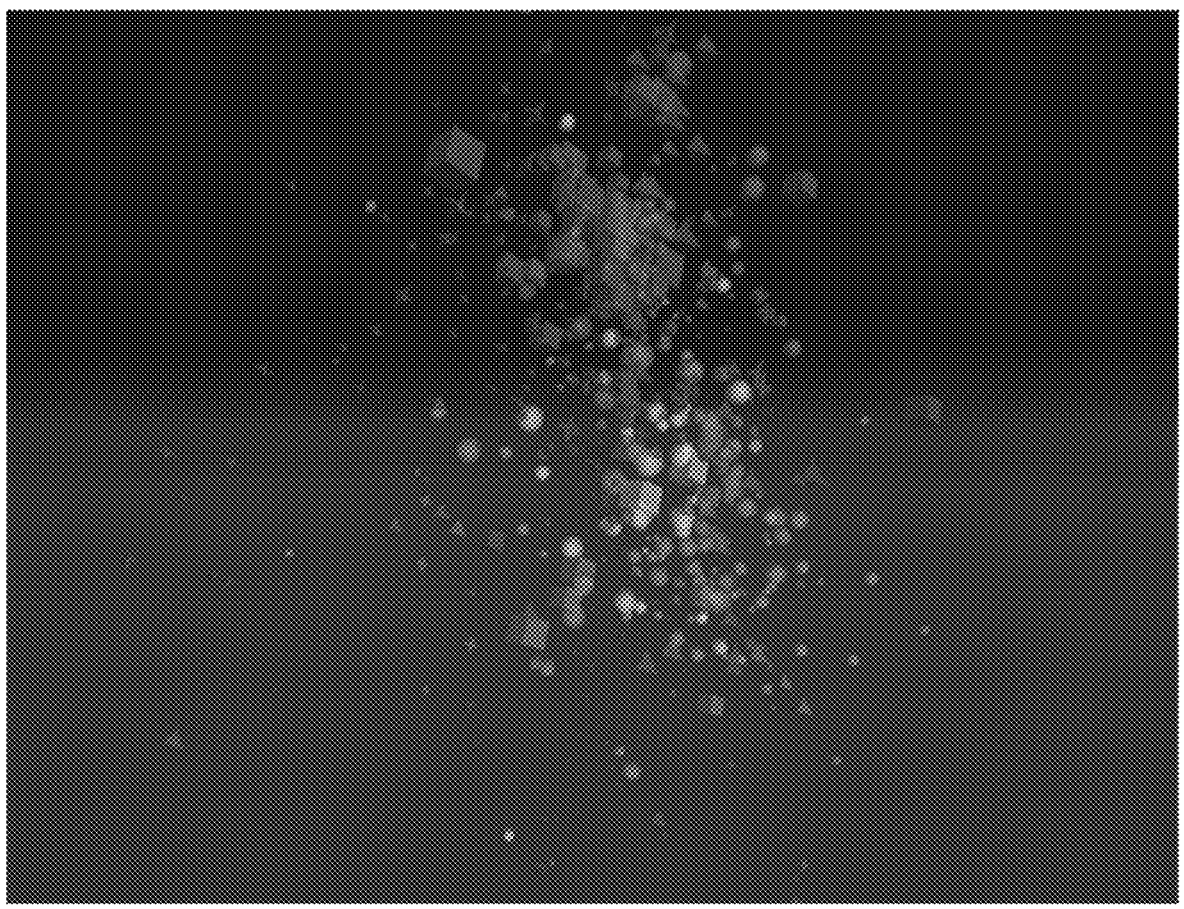
FIG. 7 is a screenshot of a rendered data in a 3D environment in accordance with an embodiment of the invention.
Figure 8:
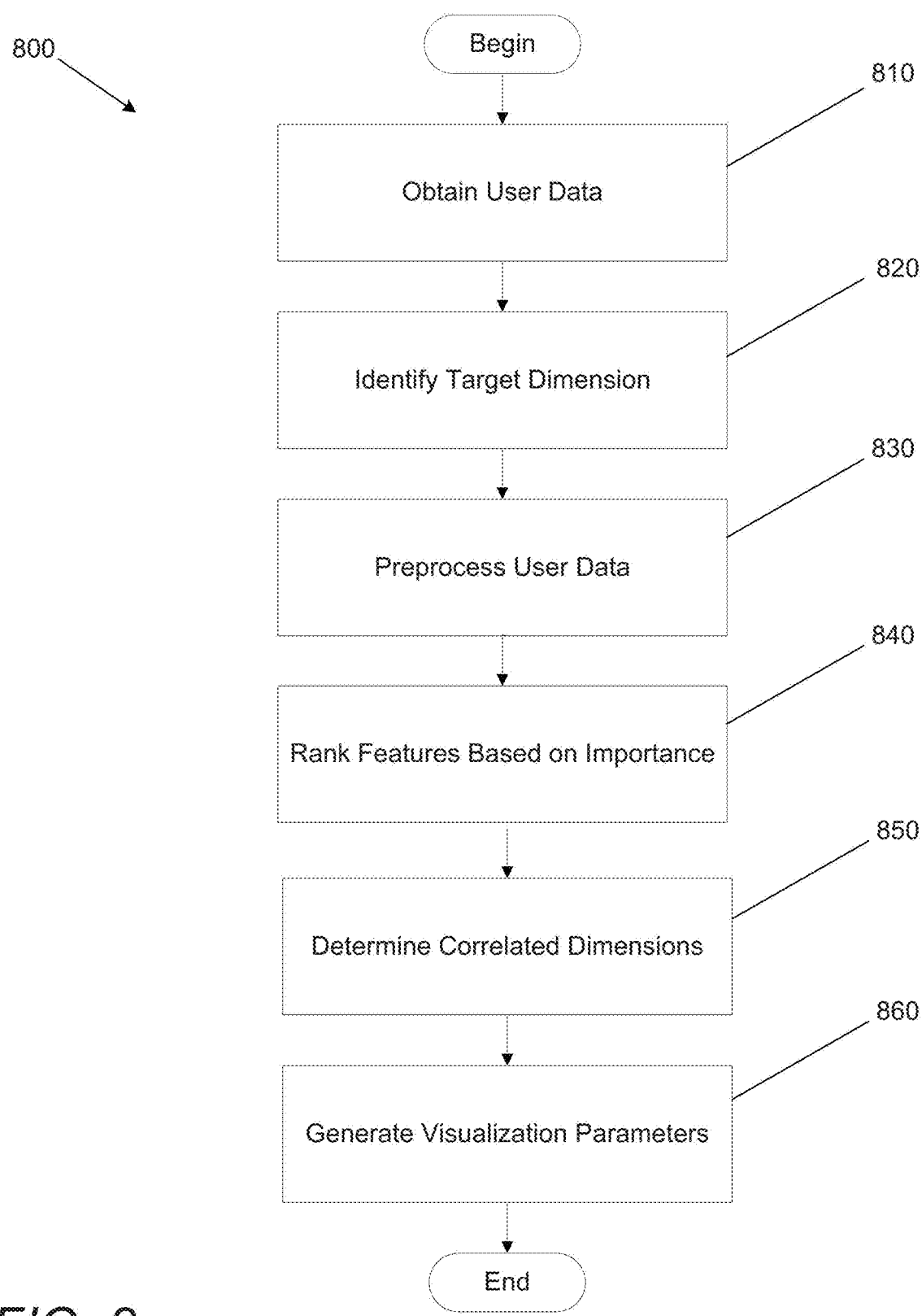
FIG. 8 is a flowchart illustrating a data visualization process for generating valuable visualization parameters in accordance with an embodiment of the invention.

Process 300 further includes rendering (360) points on the 3D mesh object using the graphics processing module. Instead of requiring individual draw calls for each point, which can be expensive, mesh generation data structures can be used to rapidly render all points using a reduced number of draw calls (fewer than the total number of points to be rendered). In numerous embodiments, a single draw call can be used to render all points. As the location of the points is already established using the 3D mesh object generated by the generic processing module, the graphics processing module is merely called upon to render objects at the appropriate vertices of the 3D mesh object. In numerous embodiments, the graphics processing module uses the list of indices to render 3D point objects around the appropriate, associated vertices. An example rendering showing a 2D representation from a specific viewpoint of a wireframe render of each drawn point with location in 3D space and shape representing dimensions of the data in accordance with an embodiment of the invention is illustrated in FIG. 6. An example rendering showing a 2D representation from a specific viewpoint of a more complete render of similar data, where location in 3D space, shape, and color are representing dimensions of the data in accordance with an embodiment of the invention is illustrated in FIG. 7.

In this way, the overhead computing costs of large numbers of draw calls (where the number of draw calls is equal to the number of data items) can be nearly eliminated. As such, many more points can be rendered in the same amount of time by leveraging circuitry designed to perform highly parallelizable tasks such as the visualization of objects at a static location. Further, processes similar to those described above can reduce memory overhead because the generic processing unit merely needs to store the point locations in main memory, rather than entire geometries for each 3D object rendered around each point.

If the viewpoint of the user has changed such that a different set of points are now visible from the viewpoint being rendered for display via the user's display, or the relative locations of the points on the display device have changed, the user viewpoint can be determined, and the points revisualized according to revised visualization parameters. In numerous embodiments, points can be incrementally moved between their starting positions and a predetermined end position over a series of several renders such that the resulting animation creates the appearance that the points are moving to their intended destination. In some embodiments, when zooming in or otherwise focusing on a particular portion of the graph, an additional data structure layer can be generated describing just the section of the lists of vertices and indices that are applicable to the new viewpoint, which can then be used for rendering.

This process can be computationally less intensive again due to the data structures used. Conventional point animation systems can require the point locations to be recalculated for each time step. However, by taking the starting location and the end location, linear interpolation processes can be performed by the graphics processing unit in a parallelized fashion to calculate the interstitial locations and render the points at those locations. A more detailed view of the mesh generation processes are described below.

Figure 4:
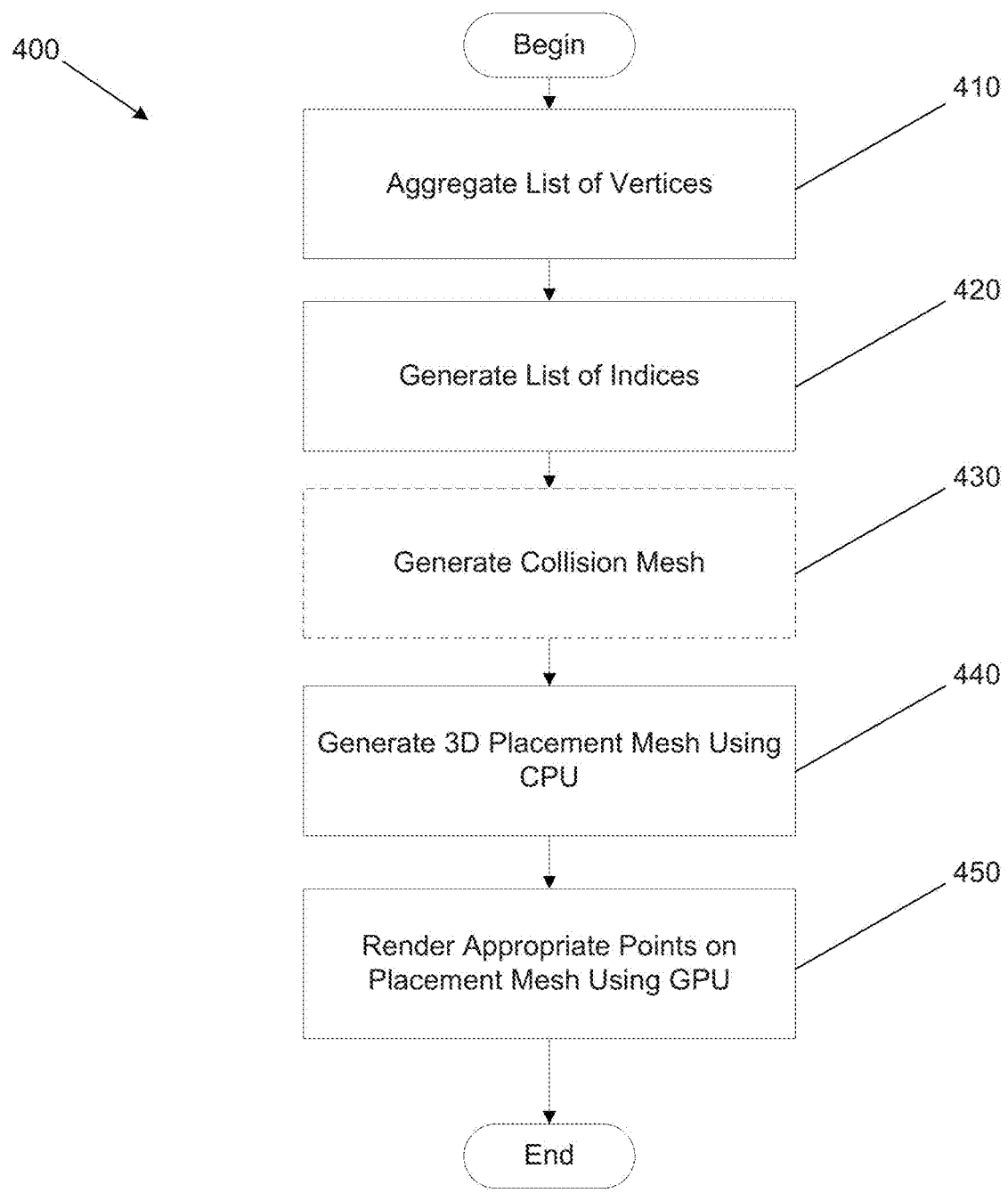
FIG. 4 is a flowchart illustrating a data visualization process for rendering data in a 3D environment in accordance with an embodiment of the invention.

Turning now to FIG. 4, a data visualization process for mesh generation and rendering 3D points in accordance with an embodiment of the invention is illustrated. Process 400 includes aggregating (410) a list of vertices. To aggregate a list of vertices to produce a list of vertices similar to the ones described above, user data can be processed. In numerous embodiments, user data is highly dimensional. As such, it can be nearly impossible to determine how the 3D location of a point will be determined depending on the number and types of dimensions. Lists of vertices can describe only the 3 dimensions of data that determine the (X,Y,Z) coordinate in 3D space, or a listing of all dimensions and an associated parameter or set of parameters describing which 3 dimensions should be used for coordinates. In numerous embodiments, the initial coordinate dimensions are determined by smart mapping processes described further below. However, initial coordinates can be naïvely determined by random selection, first three dimensions in the data, first three numerical dimensions in the data, by user selection, or by any other selection process as appropriate to the requirements of a given application of the invention.

A list of indices can be generated (420), similar to those described above. Lists of indices can include visualization parameters for each vertex in the list of vertices. Lists of indices can further include global visualization parameters that describe aspects of the render that impact every point. For example, a global shader effect may be applied to all points. However, global visualization parameters can also be stored in the mesh generation data structure. Further, different visualization parameters that have originally been designed for one purpose can be utilized for alternative purposes in accordance with varying embodiments of the invention. For example, UVs traditionally describe how to wrap a texture on a 3D object. However, channels within the UV can be instead utilized to indicate which shape and what size the shape should be for a rendered object around a vertex. In some embodiments, there is a list of shapes that have static associated values. A channel in the UV can be used as an index to the list of shapes to enable rapid lookup of shape type. Further, normal parameters generally include normal maps, which can be stored as regular RGB images where the RGB components typically correspond to the X, Y, Z coordinates, respectively, of the surface normal. However, in numerous embodiments, the RBG components can be used to store the previous location of a point, when the points are being animated and/or the viewpoint is changing.

In numerous embodiments, a collision mesh is also generated (430). Collision meshes can be used with interface devices to enable a user to interact with a particular point. In numerous embodiments, collision meshes are not visually rendered, but represent an area (e.g. a cube, sphere, or other simple geometry) around each rendered point where a user gesture, such as a cursor click or other such interface, can select a point. Collision meshes can be drawn in a similar fashion to the 3D placement mesh described above.

Similarly again to the fashion described above, the 3D placement mesh can be generated (440) using the generic processing module, and the appropriate points can be rendered on the vertices of the placement mesh using the graphics processing module. As the list of indices and list of vertices can be stored within a single data structure, the graphics processing module can operate on multiple or all points in a parallel fashion. Further, by utilizing standard 3D graphics structures (UVs, Normals, etc.) to package additional rendering information, additional efficiency can be achieved. Indeed, with the large number of points to be rendered (in many cases well over a million points can be rendered at a time), any efficiency gain is valuable.

An advantage of the above rendering method is the ease with which points can be rerendered to demonstrate different aspects of the data. Because the points can be efficiently rendered, different mappings of points can be utilized and show in rapid succession to enable users to quickly understand their data. For example, by modifying the visualization parameters, points can quickly be hidden or additional points can be drawn. Further, different dimensions of data can be swapped out to modify the existing rendered points to reflect different aspects of the dataset. In a variety of embodiments, when the physical location of points in 3D space change due to a remapping of dimensions, the original 3D placement mesh can be saved in memory for rapid switching back to previous views of the data.

Furthermore, data visualization processes can be utilized to display data in numerous different types of charts and graphs. For example, in many embodiments, data visualization systems display data in scatter plots, histograms, swarm plots, bar charts, topographies, geospatial visualizations, network visualizations, or any other visualization as appropriate to the requirements of a given application. In numerous embodiments, the type of visualization can be switched via a user interface so a user can be shown the data in various forms to help understanding. For example, data regarding credit card transactions could be displayed as a network, as a heat map over a geographic region, and/or as a histogram indicating different types of purchases using the data visualization system based on a user's need. In some embodiments, the data visualization system is integrated with a virtual office with collaboration capabilities so multiple users can interact with the data from the same and/or different viewpoints simultaneously.

While numerous types of data visualization processes for rendering data have been described with respect to specific figures and embodiments above, any number of variations, including those that utilize multiple meshes, different sets of visualization parameters, modified architectures and/or any other modification such as, but not limited to, pointers to other data structures rather than containing data structures directly within other structures, can be used as appropriate to the requirements of a given application. Data visualization processes that enable generation of visualization parameters and/or dimension mappings are illustrated below.

Data Visualization Processes for Smart Mapping

Smart mappings are mappings of data dimensions to different visualization parameters that are determined to provide the most insight into a particular aspect of the data. In many embodiments, data visualization processes for smart mapping include the generation of sets of visualization parameters for a data set that provides optimized value for human understanding. For example, a smart mapping for an N-dimensional data set may provide three primary dimensions X, Y, and Z for 3D coordinates, and an additional set of dimensions $d_1, d_2, \ldots, d_t$ for mapping to visual or sonic visualizations (shape, size, vibration, sound, etc.). Smart mapping techniques in accordance with numerous embodiments of the invention are capable of providing multiple mappings and ranking them. In many embodiments, suggested mappings can include different visualization styles that are capable of being rendered by the data visualization system such as, but not limited to, scatter plots, histograms, swarm plots, bar charts, topographies, geospatial visualizations, network visualizations, or any other visualization as appropriate to the requirements of a given application.

A data visualization process for generating visualization parameters for smart mapping in accordance with an embodiment of the invention is illustrated in FIG. 800. Process 800 includes obtaining (810) user data. In many embodiments, user data is obtained in a manner similar to those described above. At least one target can be identified (820) within the user data. In numerous embodiments, the target is the dimension of the data that is of particular interest as indicated by a user. Target dimensions are aspects of a data item within the data (e.g. a column, where a row represents a single data item). The user can change which features are target dimensions at any time.

Process 800 further includes preprocessing (830) user data. In some embodiments, only dimensions that a user is interested in may be selected for further processing. For example, if the target dimension is crime rate, dimensions regarding, for example, case numbers for arrests, may not be desired for further processing. Users can selectively choose which dimensions are included for processing. Additionally, in many embodiments, dynamic sub-sampling of records can be performed to reduce the overall size of the data in order to reduce processing time. In some embodiments, the size of the sub-samples is dependent upon the size of the user data.

Further, user data may have dimensions that are both numerical and non-numerical. Numerical data can generally be used in its raw form, but may be processed to be more usable (e.g. rounded, truncated, etc.). Non-numerical data is often categorical in nature, and may present as text. Processes can be used to enumerate text as categorical variables within a dimension. In many embodiments, categorical variables require additional processing power and/or time to incorporate fully into a smart mapping analysis. As such, in situations where it is useful to reduce the number of categorical variables to be considered, the most frequently occurring variables in a dimension may be kept, where those that occur below a frequency threshold are all counted as a single variable (e.g. "other"). For example, if only 5 variables per categorical dimension were used, the dimension could be processed to only have {A, B, C, D, and Other}.

Process 800 includes ranking (840) dimensions based on their importance. In numerous embodiments, machine learning models can be used to determine importance. For example, random forests can be used to determine which dimensions have the most impact on the target dimension. In numerous embodiments, random forests consider every dimension and every value for that dimension, i.e. all of the available data, to make predictions at each decision point in the tree. In a variety of embodiments, the accuracy of the predictions is less important than determining which dimensions are the most important with respect to a target dimension. In such cases, a histogram-based splitting method can be utilized to increase computational efficiency. While histogram-based splitting can sometimes reduce accuracy of predictions from a random-forest, the outputs can still indicate which dimensions are descriptive of the target dimension. In many embodiments, histogram-based splitting is accomplished by binning a set of records into a number of bins for each dimension, and then making decisions at each decision point in the tree based on the bins. In this way, a reduced number of splits can be tested in order to proceed with traversal.

In numerous embodiments, bins are defined by at least the smallest value in the bin, the largest value in the bin, and the number of points that fall between those two bounds. The number of bins can be predetermined (e.g. a set number of 10 bins), set based on the data itself (e.g. dependent upon the total number of features), and/or set by a user. However, any number of methods can be used to set the number of bins used. Further, the set of features binned can be any number of features such as all features in the dataset or a subset of all of the features. In a variety of embodiments, machine learning techniques and/or algorithmic selection techniques are used to determine to which features binning techniques are applied.

While the above addresses random forest based techniques in particular, any number of machine learning models can be used to rank dimensions as appropriate to the requirements of specific applications of embodiments of the invention.

Data visualization systems can determine (850) correlated dimensions within the user data. In many embodiments, correlations between dimensions can be performed using statistical models, such as, but not limited to, cosine similarity, Pearson correlations, or any other model as appropriate to the requirements of a given application. From this process, a listing of dimensions with associated importance metrics can be produced. In a variety of embodiments, pairwise correlations are performed between dimensions to provide additional statistical correlation information. In numerous embodiments, the importance of each dimension is calculated with respect to a target dimension of interest selected by the user.

Process 800 can further include generating (860) visualization parameters based on the importance of each feature. In some embodiments, the dimensions that score below a predetermined relevancy threshold are not considered for mapping to visualization parameters. For example, in some embodiments, only the top 70% (where 70% has been arbitrarily selected, and could clearly be any threshold value) of dimensions as ranked by importance are considered for mapping to visualization parameters.

Smart mappings can attempt to balance a desire for low dimensionality with the value of the insights. As representations of dimensionality increase, untrained users may have a more difficult time interpreting the data. For example, untrained users may have difficulty interpreting beyond 5 dimensions (X, Y, Z, color, shape). A dimensionality threshold can be used to limit the number of dimensions that are represented at a given time. However, the desired number of dimensions for visualization can be predetermined by the user. Selected sets of visualization parameters selected by the user can be used to visualize data in insightful ways using data visualization processes for rendering data similar to those described above.

Further, sets of data visualization parameters may generate different types of graphs. In many embodiments, based on the number of dimensions as a whole, and/or the number of categorical and/or numerical dimensions, different types of representations may be desirable. In some embodiments, each set of data visualization parameters may result in a graph representing a different number of dimensions. For example, a line graph may be appropriate to the particular insight of interest, and so appropriate dimensions for each visualization parameter can be selected to generate a line graph. In numerous embodiments, the most valuable numerical dimensions are used for the coordinates of the point in 3D space. Color is easily understood by the human visual system, and is therefore selected in numerous embodiments to describe the target dimension. However, the target dimension can be visualized using any different visualization parameter as appropriate to the requirements of a given application.

Figure 10:
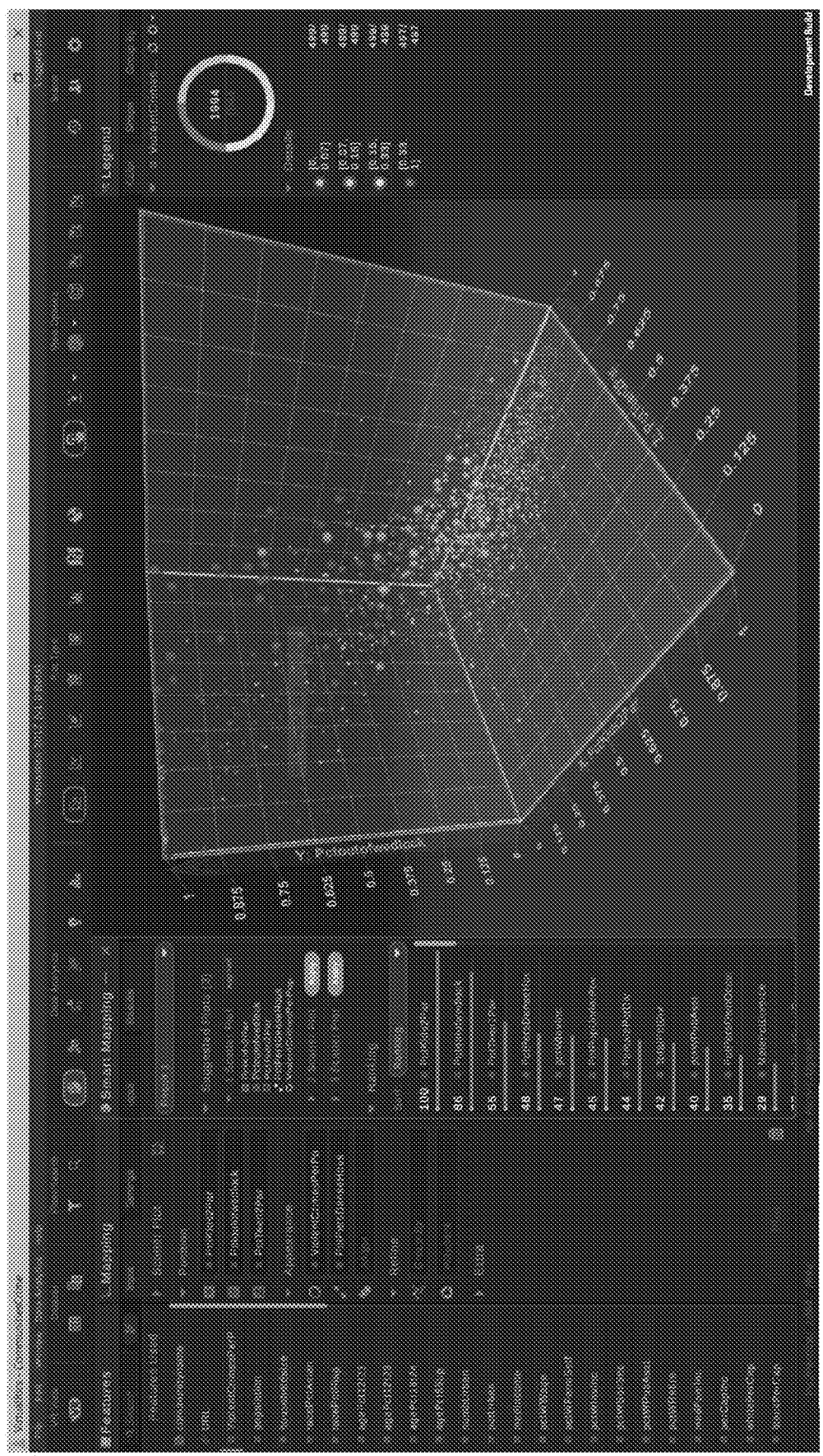
FIG. 10 is a screenshot of an interface from a data visualization system in accordance with an embodiment of the invention.
Figure 11:
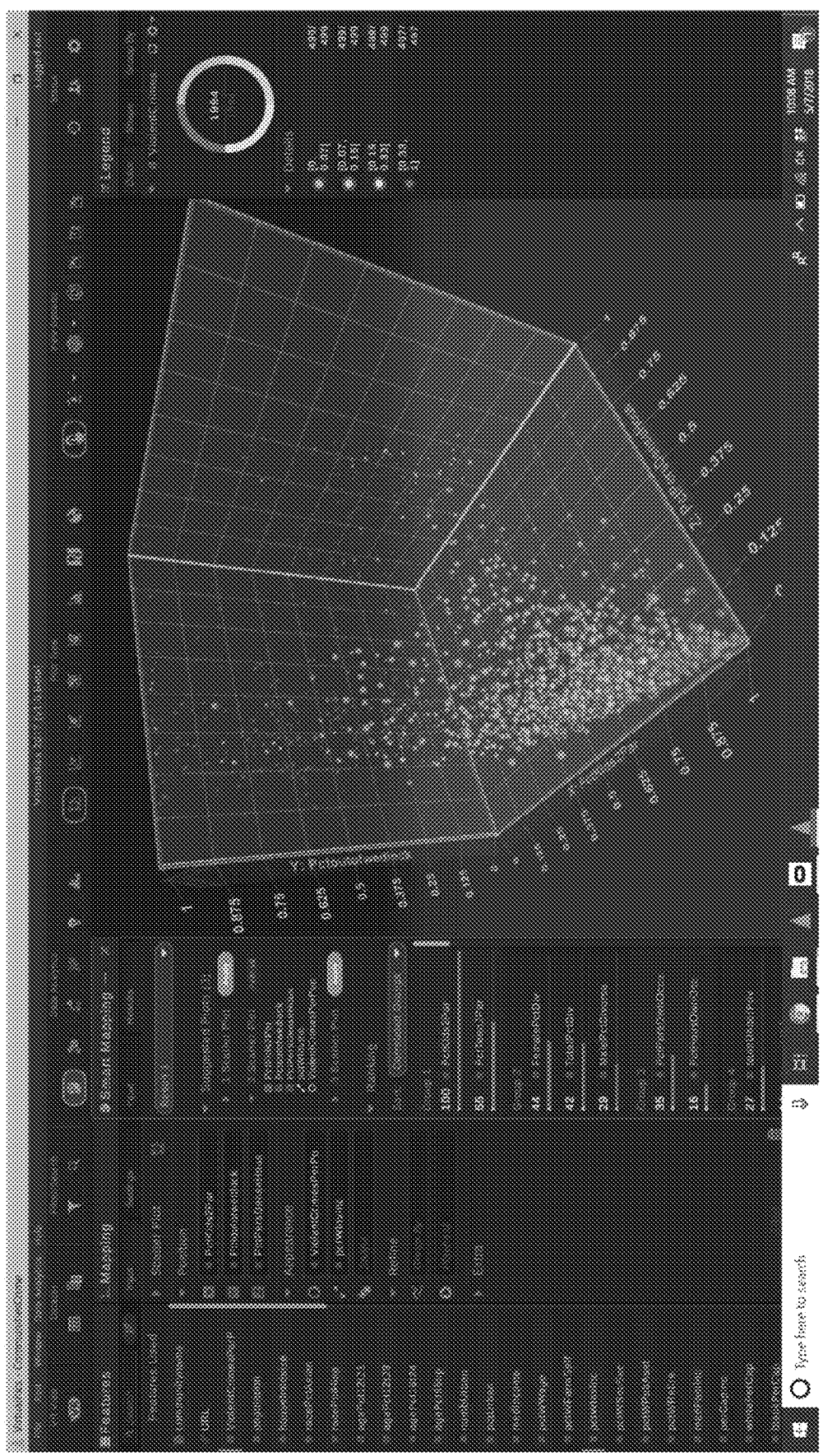
FIG. 11 is a screenshot of an interface from a data visualization system in accordance with an embodiment of the invention.
Figure 12:
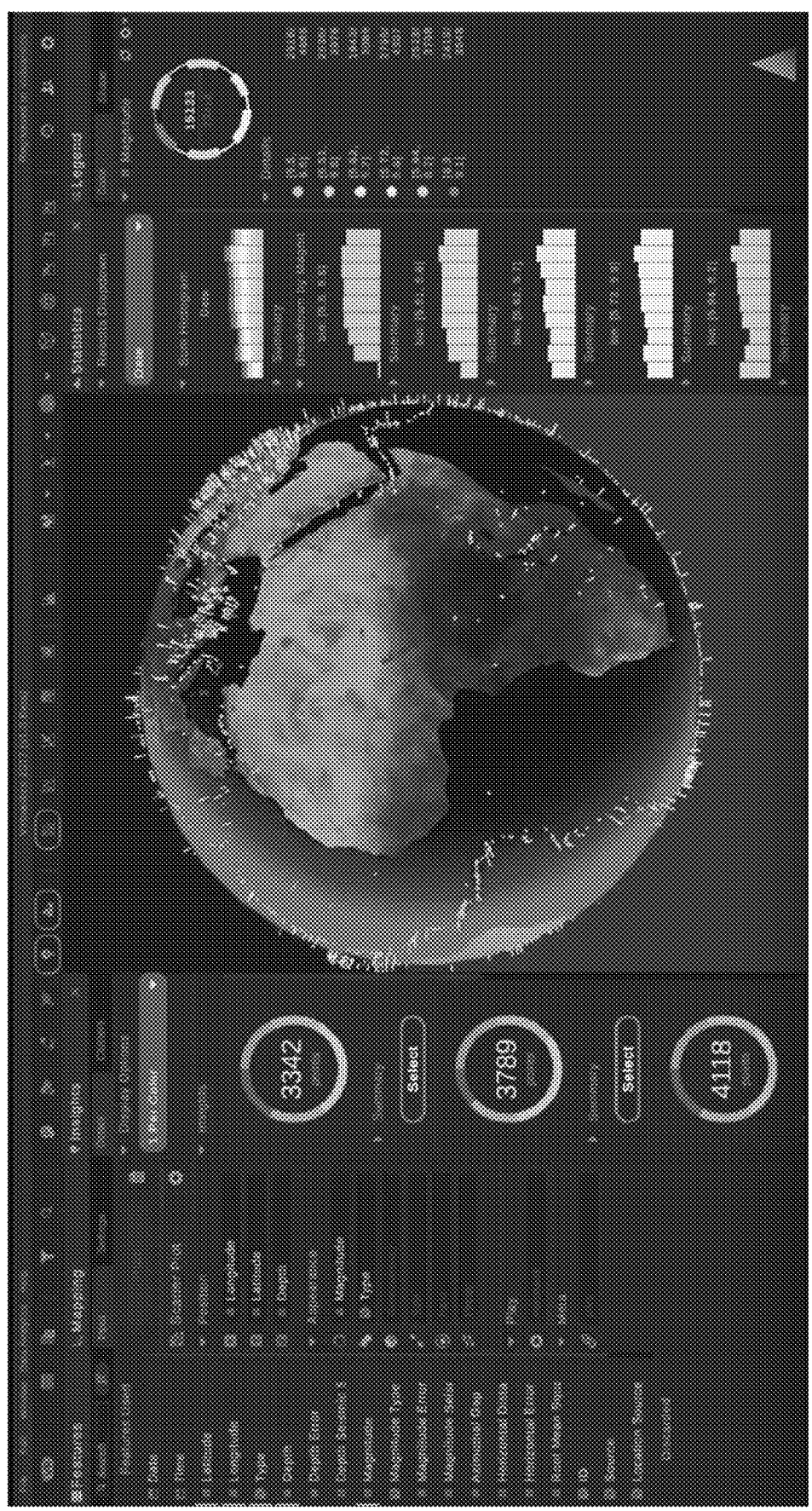
FIG. 12 is a screenshot of an interface from a data visualization system in accordance with an embodiment of the invention.
Figure 13:
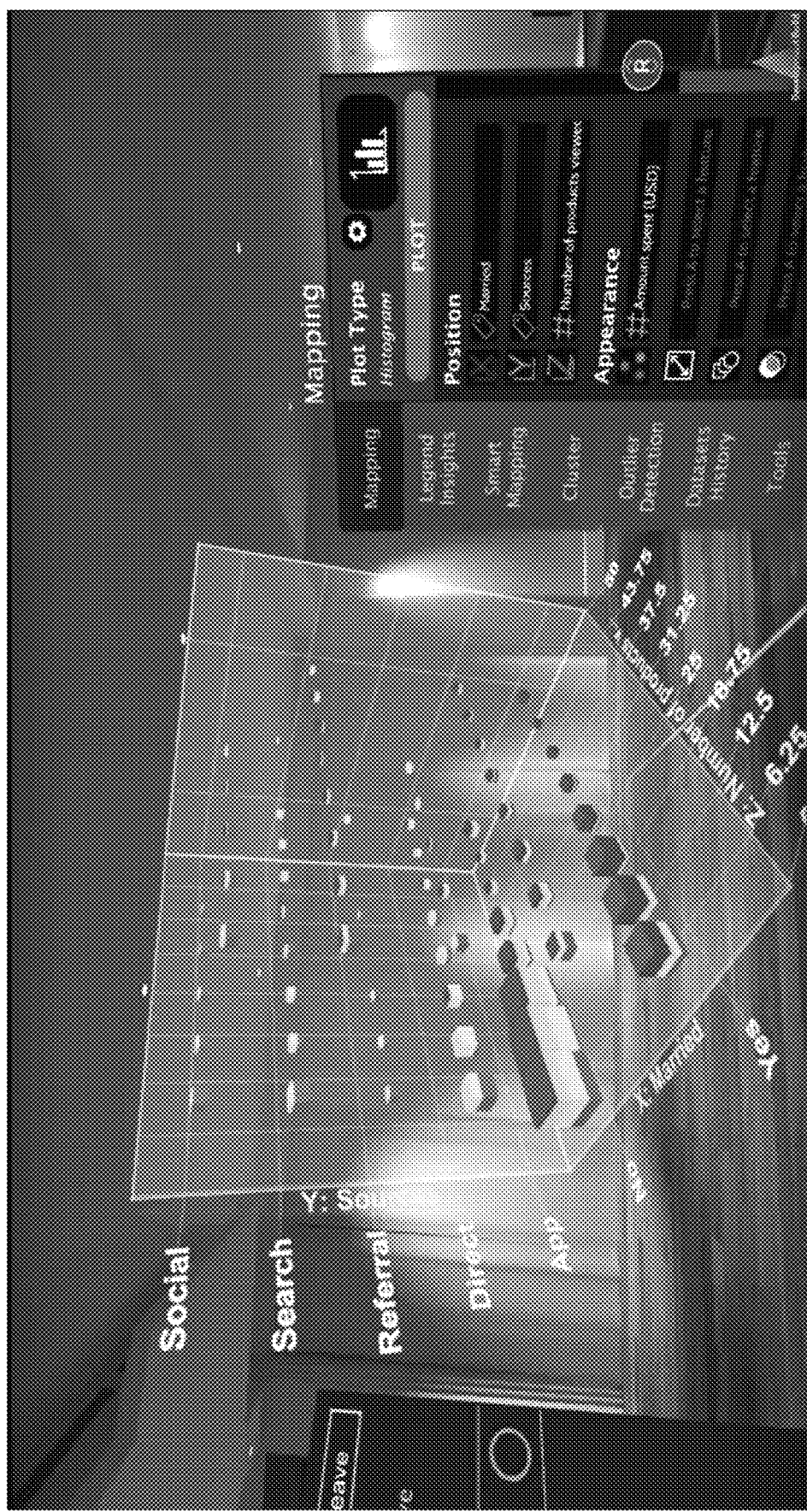
FIG. 13 is a screenshot of an interface from a data visualization system in accordance with an embodiment of the invention.

In many embodiments, multiple different sets of visualization parameters can be generated. In numerous embodiments, a set of visualization parameters reflects the top most important dimensions. However, in some situations, depending on the statistical model used, the dimensions illustrated based only on importance is not particularly useful. For example, if a dataset includes dimensions (age in years, age in months, and age in days), they will all have nearly identical (if not identical) correlations with the target dimension, yet will not provide any additional insight as each dimension describes the same value in different ways. To address this, in many embodiments, dimensions are grouped by how closely they are correlated to one another (e.g. using the above pairwise correlations), and only the top most important feature per group is selected for use in the data visualization. For example, groups of highly correlated features may be {A, B, C}, {P, Q, R}, {X, Y, Z}, where each set is ordered by importance of dimension, so the final smart mapping (assuming only 3 dimensions are to be visualized), would be {A, P, X}. In numerous embodiments, different selection mechanisms or number of dimensions to be selected can be utilized as appropriate to the requirements of a given application. Exemplary suggested smart mappings generated by data visualization systems in accordance with an embodiment of the invention are illustrated in FIGS. 10 and 11. Additional example visualizations can be found in videos at www.youtube.com/watch?v=YkoTfENJxL4, the entirety of which are herein incorporated by reference in their entirety.

In many embodiments, the graph generated in accordance with the visualization parameters can be described using natural language generation processes. Descriptions of the graph are called "insights," and can enhance usability of the system by enabling users to understand their data in new ways. Insight generation can happen continuously and/or asynchronously such that additional and/or refined smart mappings can be suggested over time. In many embodiments, data visualization processes for smart mapping can be continuously performed on the same dataset over time to improve and/or generate additional sets of visualization parameters or insights.

Figure 9:
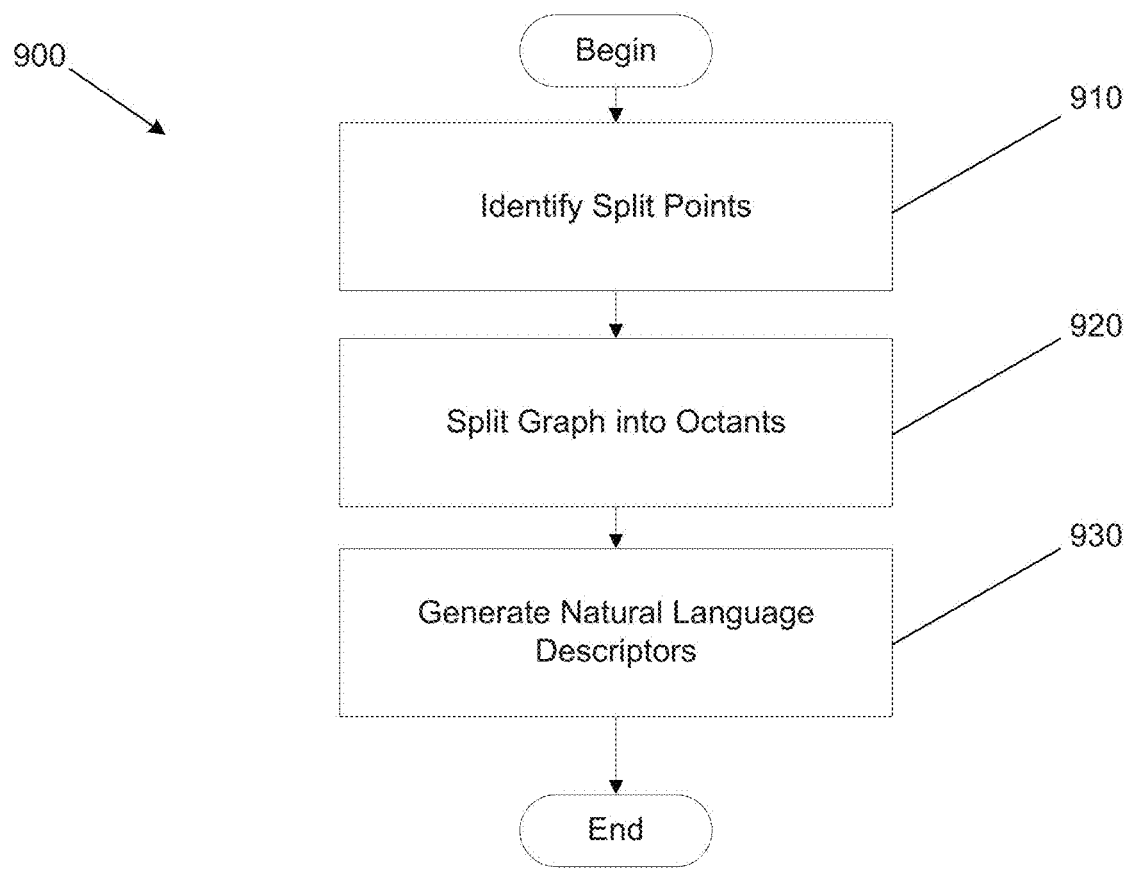
FIG. 9 is a flowchart illustrating a data visualization process for interpreting data in accordance with an embodiment of the invention.

Insights can be generated in a number of ways. In some embodiments, the structure of the graph as a whole is described. However, in numerous embodiments, the graph is split into regions that can be described with higher degrees of detail. Turning now to FIG. 9, a data visualization process for generating insights in accordance with an embodiment of the invention is illustrated. Process 900 includes identifying (910) split points on the X, Y, and Z axes. In numerous embodiments, this is achieved by identifying the median for each axis. In this way, the graph would be split (920) into octants. Each octant can be separately analyzed so that the data can be more specifically described. In some embodiments, natural language generation processes are used to generate (930) descriptors for portions and/or all of the graph.

In a variety of embodiments, the splits to generate octants can be determined using a shallow decision tree (for example using a depth of 3 to reduce complexity, however any depth can be used as appropriate to the dimensionality and volume of the data, as well as available processing power). Further, in some embodiments, more than one split per axis can be appropriate, resulting in additional sectors of the graph beyond eight. Indeed, utilizing more than one split per axis, or no splits on a particular set of axes may enable visualizing the data according to a target distribution.

Indeed, set geometric separation of the graph is not a requirement for generating insights. In a variety of embodiments, cluster based insights can be generated by performing k-means clustering based on the dimensions of the coordinate axes. Spatial separation between points can be determined, and then each separate sector can be analyzed to determine differences between the data items in each sector.

In numerous embodiments, time is a dimension of the data set. In such cases, directionality of the data can be considered when generating insights. In some embodiments, missing time series data is interpolated and/or flagged to a user. In a variety of embodiments, time interpolated cross-correlation can be used to interpolate time-series data.

Further, network visualization can be used to find network structures within the data that may provide additional information from which to generate insights. Processes for producing network visualizations are discussed below.

Network Visualizations

Figure 14:
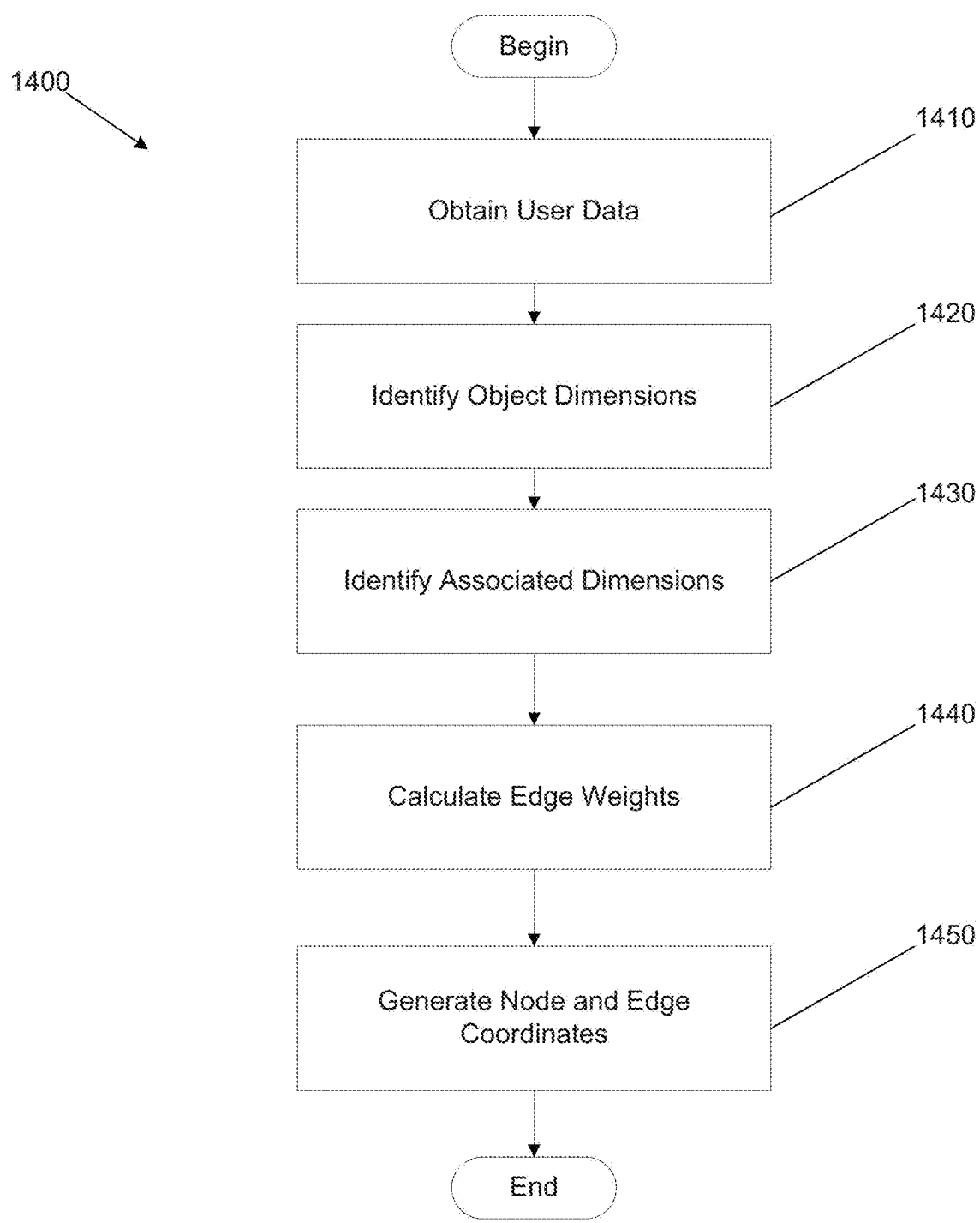
FIG. 14 is a flowchart illustrating a process for extracting graph data from abstract data in accordance with an embodiment of the invention.

In many situations, it can be valuable to observe data in the form of a graph. Typically, graphs consist of nodes connected by edges. Edges can have orientations or no orientations, directed and undirected graphs, respectively. Graphs can be used to display data in a way that makes readily apparent patterns, clusters, and/or connections that are sometimes otherwise difficult to manifest from a data set. Further, graphical representations of data can be used with a suite of graph-based algorithms that can generate additional insights into data. In numerous embodiments, data visualization systems represent a data set in graph form. Data visualization systems can ingest abstract data and convert it into a graph-based format using a network extractor tool. A process for network extraction from abstract data in accordance with an embodiment of the invention is illustrated in FIG. 14.

Process 1400 includes obtaining (1410) user data. In numerous embodiments, user data is "abstract." That is, the data is not in a form conventionally representative of a graph (e.g. defining nodes and edges). Object dimensions are identified (1420). In many embodiments, only a single object dimension is identified per extraction. However, any number of object dimensions can be identified. Object dimensions can be representative of nodes in a graph. For example, in numerous embodiments, each value in the object dimension can be represented as a node in the graph. In a variety of embodiments, object dimensions are selected by the user as a dimension of interest. However, machine learning processes similar to those described above can be used to automatically select object dimensions.

Associated dimensions are identified (1430) which can be representative of edges in a graph. In numerous embodiments, associated dimensions are selected by a user as information relative to an object dimension. However, associated dimensions can be automatically selected using machine learning processes similar to those described above. Edge weights can be calculated (1440) from associated dimensions. In numerous embodiments, edges represent the values stored in associated dimensions. In many embodiments, edge weights can be determined based on values in associated dimensions and/or object dimensions. Numerous different ways to calculate edge weights can be used as appropriate to the requirements of specific applications of embodiments of the invention. In many embodiments, edge weights can reflect the count of times a unique object is present in the same record as a unique value in an associated dimension. In a variety of embodiments, the values stored in an associated dimension can directly be reflected as the edge weights of a graph. In numerous embodiments, edge weights can be calculated using a distance calculation. Indeed, any number of distance metrics generated by distance calculations can be used as edge weights including, but not limited to, Euclidean distance metrics. In various embodiments, distance calculations can be accelerated using geometric indexing.

Node and Edge coordinates are generated (1450) from the object dimensions and edge weights. In many embodiments, coordinates are algorithmically generated using algorithms similar to ForceAtlas2 by Jacomy et al. However, any number of graph generation algorithms can be used to generate graph representations. The node and edge coordinates can be saved in memory as an alternative representation of the User Data, and, in some embodiments, the saved coordinate data can be more memory efficient to store than the abstract user data. In numerous embodiments, coordinate data extracted by network extractor tools can output data in various file formats including, but not limited to, Json, adjacency matrices, DOT files, or any other format as appropriate to the requirements of specific applications of embodiments of the invention. In numerous embodiments, data visualization systems are able to ingest coordinate data directly, rather than extracting it from abstract user data.

The generated graphs can be provided to users via data visualization systems. In many embodiments, graphs can be mapped to geospatial environments. In a variety of embodiments, edge weights are represented using color, animation, thickness, or any other visualization parameter as appropriate to the requirements of specific applications of embodiments of the invention. Further, generated graphs can be analyzed using graph-based algorithms such as, but not limited to, PageRank, shortest path algorithms, widest path algorithms, centrality algorithms, distance algorithms, or any other graph-based algorithm as appropriate to the requirements of specific applications of embodiments of the invention. In many embodiments, additional analysis processes similar to those described above with respect to abstract data can be applied to generated graphs.

Although specific systems and methods for visualizing large scale, high dimensional data are described above, many different system architectures and visualization methods can be implemented in accordance with many different embodiments of the invention. It is therefore to be understood that the present invention may be practiced in ways other than specifically described, without departing from the scope and spirit of the present invention, for example, by performing steps in the processes in different orders, in parallel, and/or with added, subtracted, and/or substitute steps. Thus, embodiments of the present invention should be considered in all respects as illustrative and not restrictive. Accordingly, the scope of the invention should be determined not by the embodiments illustrated, but by the appended claims and their equivalents.

What is claimed is:

1. A data visualization system comprising:
   at least one central processing unit (CPU);
   at least one graphics processing unit (GPU); and
   a memory comprising a data visualization application, where the data visualization application directs the at least one CPU to:
   obtain data comprising a set of records, where each record has at least three data dimensions;
   store the obtained data in a table structure, where each record is represented by a row in the table structure, each dimension is represented by a column in the table structure, and each cell is populated with a value corresponding to the obtained data;
   generate at least one mapping from the at least three data dimensions to a set of visualization dimensions, where the mapping comprises a set of visualization parameters assigned to each column in the table structure, where each visualization parameter in the set of visualization parameters describes how an arbitrary value in the column should be visualized;
   generate a data structure using the at least one CPU, where the data structure comprises:
   a first list comprising locations of points in a set of unrendered points, where each unrendered point is located in 3D space and represents values in at least one record; and
   a second list comprising visualization information describing how to render a set of 3D objects, where each 3D object is centered around a respective unrendered point in the set of unrendered points, based on the visualization parameters;
   provide the at least one GPU with the data structure; and
   render the 3D objects in a virtual 3D environment in accordance with the corresponding visualization information of the second list centered at the corresponding locations of the first list using the at least one GPU and the data structure, where the at least one GPU renders the 3D objects in parallel.

2. The data visualization system of claim 1, wherein the data visualization application further directs the at least one CPU to automatically generate the mapping of the data.

3. The data visualization system of claim 1, wherein to generate the at least one mapping, the data visualization application further directs the at least one CPU to:
   identify a target dimension from the at least three data dimensions;
   calculate ranking metrics reflecting the impact of non-target dimensions on the target dimension;
   calculate correlation coefficients reflecting to what degree remaining dimensions are correlated; and
   generate the set of visualization parameters based on the ranking metrics and the correlation coefficients.

4. The data visualization system of claim 3, to calculate ranking metrics, the data visualization application further directs the at least one CPU to apply a machine learning model.

5. The data visualization system of claim 4, wherein the machine learning model is a random forest.

6. The data visualization system of claim 5, wherein the data visualization application further directs the at least one CPU to apply histogram-based splitting in the random forest.

7. The data visualization system of claim 3, wherein the correlation coefficients are Pearson correlation coefficients.

8. The data visualization system of claim 3, wherein the data visualization application further directs the at least one CPU to select a chart type that attempts to best provide insights with respect to the target dimension to a human.

9. The data visualization system of claim 8, wherein the chart type is selected from the group consisting of: scatter plots, histograms, swarm plots, bar charts, heat maps, topographic maps, geospatial visualizations, and network visualizations.

10. The data visualization system of claim 1, wherein the 3D virtual environment is a 3D virtual office.

11. A method for data visualization comprising:
    obtaining data comprising a set of records, where each record has at least three data dimensions;
    storing the obtained data in a table structure, where each record is represented by a row in the table structure, each dimension is represented by a column in the table structure, and each cell is populated with a value corresponding to the obtained data;
    generating at least one mapping from the at least three data dimensions to a set of visualization dimensions, where the mapping comprises a set of visualization parameters assigned to each column in the table structure, where each visualization parameter in the set of visualization parameters describes how an arbitrary value in the column should be visualized;
    generating a data structure using at least one central processing unit (CPU), where the data structure comprises:
    a first list comprising locations of points in a set of unrendered points, where each unrendered point is located in 3D space and represents values in at least one record; and
    a second list comprising visualization information describing how to render a set of 3D objects, where each 3D object is centered around a respective unrendered point in the set of unrendered points, based on the visualization parameters;
    providing at least one graphics processing unit (GPU) with the data structure; and
    rendering the 3D objects in a virtual 3D environment in accordance with the corresponding visualization information of the second list centered at the corresponding locations of the first list using the at least one GPU and the data structure, where the at least one GPU renders the 3D point objects in parallel.

12. The data visualization method of claim 11, further comprising automatically generating the mapping of the data.

13. The data visualization system of claim 11, wherein generating the at least one mapping further comprises:
    identifying a target dimension from the at least three data dimensions;

calculating ranking metrics reflecting the impact of non-target dimensions on the target dimension;

calculating correlation coefficients reflecting to what degree remaining dimensions are correlated; and generating the set of visualization parameters based on the ranking metrics and the correlation coefficients.

14. The data visualization method of claim 13, wherein calculating ranking metrics further comprises applying a machine learning model.

15. The data visualization method of claim 14, wherein the machine learning model is a random forest.

16. The data visualization method of claim 15, further comprising applying histogram-based splitting in the random forest.

17. The data visualization method of claim 13, wherein the correlation coefficients are Pearson correlation coefficients.

18. The data visualization method of claim 13, further comprising selecting a chart type that attempts to best provide insights with respect to the target dimension to a human.

19. The data visualization method of claim 18, wherein the chart type is selected from the group consisting of: scatter plots, histograms, swarm plots, bar charts, heat maps, topographic maps, geospatial visualizations, and network visualizations.

20. A data visualization system comprising:
at least one central processing unit (CPU);
at least one graphics processing unit (GPU); and
a memory comprising a data visualization application, where the data visualization application directs the at least one CPU to:
obtain data comprising a set of records, where each record has at least three data dimensions;
store the obtained data in a table structure, where each record is represented by a row in the table structure, each dimension is represented by a column in the table structure, and each cell is populated with a value corresponding to the obtained data;
identify a target dimension from the at least three data dimensions;
calculate ranking metrics reflecting the impact of non-target dimensions the target dimension;
calculate correlation coefficients reflecting to what degree remaining dimensions are correlated;
select a subset of the at least three data dimensions comprising the target dimension and at least one of the remaining data dimensions based on the ranking metrics and the correlation coefficients such that the cardinality of the subset of the at least three data dimensions is at or below a dimensionality threshold;
generate at least one mapping from the dimensions in the subset of the at least three data dimensions to a set of visualization dimensions using the selected subset of data dimensions, where the mapping comprises:
a set of visualization parameters assigned to each column in the table structure, where each visualization parameter in the set of visualization parameters describes how an arbitrary value in the column should be visualized;
generate a data structure using the at least one CPU, where the data structure comprises:
a first list comprising locations of points in a set of unrendered points, where each unrendered point is located in 3D space and represents values in at least one record; and
a second list comprising visualization information describing how to render a set of 3D objects, where each 3D object is centered around a respective unrendered point in the set of unrendered points, based on the visualization parameters;
provide the at least one GPU with the data structure; and
render the 3D objects in a virtual 3D environment in accordance with the corresponding visualization information of the second list centered at the corresponding locations of the first list using the at least one GPU and the data structure, where the at least one GPU renders the 3D objects in parallel.

* * * * *